US008346785B1

(12) United States Patent
Benton, Jr.

(10) Patent No.: US 8,346,785 B1
(45) Date of Patent: Jan. 1, 2013

(54) PERFORMING ABSTRACTION AND/OR INTEGRATION OF INFORMATION

(75) Inventor: Kenneth R. Benton, Jr., Richmond, VA (US)

(73) Assignee: TransThought, LLC, Richmond, VA (US)

( * ) Notice: Subject to any disclaimer, the term of this patent is extended or adjusted under 35 U.S.C. 154(b) by 540 days.

(21) Appl. No.: 12/355,183

(22) Filed: Jan. 16, 2009

Related U.S. Application Data

(60) Provisional application No. 61/021,414, filed on Jan. 16, 2008.

(51) Int. Cl.
*G06F 17/30* (2006.01)

(52) U.S. Cl. ........................................................ 707/756

(58) Field of Classification Search ................... 707/756
See application file for complete search history.

(56) References Cited

U.S. PATENT DOCUMENTS

| | | | | |
|---|---|---|---|---|
| 4,951,196 | A | 8/1990 | Jackson | |
| 5,367,664 | A | 11/1994 | Magill et al. | |
| 5,794,234 | A * | 8/1998 | Church et al. | 1/1 |
| 6,160,883 | A | 12/2000 | Jackson et al. | |
| 6,185,505 | B1 | 2/2001 | Kelmenson et al. | |
| 6,408,303 | B1 | 6/2002 | Richards | |
| 6,658,598 | B1 | 12/2003 | Sullivan | |
| 6,839,724 | B2 | 1/2005 | Manchanda et al. | |
| 6,871,187 | B1 | 3/2005 | Gosko | |
| 7,143,190 | B2 | 11/2006 | Christensen et al. | |
| 7,200,674 | B2 | 4/2007 | Sapuram et al. | |
| 7,216,101 | B2 | 5/2007 | Renwick et al. | |
| 7,237,014 | B2 | 6/2007 | Drummond, II | |
| 7,269,701 | B2 | 9/2007 | Shackelford et al. | |
| 7,860,934 | B1 * | 12/2010 | Wolfe et al. | 709/206 |
| 2002/0049790 | A1 | 4/2002 | Ricker et al. | |
| 2003/0014270 | A1 | 1/2003 | Qureshi et al. | |
| 2006/0045366 | A1 | 3/2006 | Chefd'hotel | |
| 2006/0223518 | A1 | 10/2006 | Haney | |
| 2008/0168081 | A1 * | 7/2008 | Gaurav et al. | 707/102 |

* cited by examiner

*Primary Examiner* — Jorge A Casanova
*Assistant Examiner* — Alan Graham
(74) *Attorney, Agent, or Firm* — Bergman & Song LLP; James T. Beran

(57) ABSTRACT

Abstraction and/or integration can be performed on information, e.g. transaction data items in standard and/or proprietary formats, using data processing systems. For example, standard-based abstraction operations can analyze transaction data items in standard format to obtain transaction segment data items, each about a transaction segment; transaction segment data items can be used to obtain and store segment group data structures, each about a type of transaction segment data items and which can also include standard-based abstraction artifacts. Abstraction operations on standard or proprietary format can automatically extract pre-integration information, such as usage attributes, useful in integration and for other purposes. Integration can be performed on transaction type attribute data, producing merged attribute data including mapping attributes, such as based on match results from associated fields of selected transaction types in different formats. Attribute data items being integrated can include pre-integration information and segment group data structures with standard-based abstraction artifacts.

31 Claims, 16 Drawing Sheets

<table>
<tr><th></th><th>TOTAL</th><th>0171122 (2)</th><th>04361111 (1)</th><th>43622222</th><th>0436333333 (2)</th><th>7611111111</th><th>0762222 (2)</th></tr>
<tr><td>BIG ||val</td><td>2</td><td>0</td><td>0</td><td>0</td><td>0</td><td>0</td><td>0</td></tr>
<tr><td>BIG |val ||val|val|||CR</td><td>1</td><td>0</td><td>0</td><td>0</td><td>0</td><td>0</td><td>0</td></tr>
<tr><td>BIG |val |val||val|||CR</td><td>1</td><td>0</td><td>0</td><td>0</td><td>0</td><td>0</td><td>0</td></tr>
<tr><td>BIG |val |val|val|val</td><td>1</td><td>0</td><td>0</td><td>0</td><td>0</td><td>0</td><td>0</td></tr>
<tr><td>BIG |val |val|val|val|||CR</td><td>38</td><td>1</td><td>1</td><td>0</td><td>0</td><td>1</td><td>0</td></tr>
<tr><td>BIG |val |val|val|val|||DI</td><td>156</td><td>1</td><td>1</td><td>1</td><td>1</td><td>1</td><td>1</td></tr>
<tr><td>BIG |val |val|val|val|val||CR</td><td>1</td><td>1</td><td>0</td><td>0</td><td>0</td><td>0</td><td>0</td></tr>
<tr><td>BIG |val |val|val|val|val||DI</td><td>4</td><td>1</td><td>0</td><td>0</td><td>0</td><td>0</td><td>0</td></tr>
<tr><td>BIG TOTAL</td><td>204</td><td>4</td><td>2</td><td>1</td><td>1</td><td>2</td><td>1</td></tr>
<tr><td>N3 |</td><td>1</td><td>0</td><td>1</td><td>0</td><td>0</td><td>0</td><td>0</td></tr>
<tr><td>N3 ||val</td><td>1</td><td>0</td><td>1</td><td>0</td><td>0</td><td>0</td><td>0</td></tr>
<tr><td>N3 |val</td><td>8</td><td>1</td><td>1</td><td>0</td><td>1</td><td>0</td><td>1</td></tr>
<tr><td>N3 |val|val</td><td>157</td><td>1</td><td>1</td><td>1</td><td>1</td><td>1</td><td>1</td></tr>
<tr><td>N3 TOTAL</td><td>167</td><td>2</td><td>4</td><td>1</td><td>2</td><td>1</td><td>2</td></tr>
<tr><td>N4 |val</td><td>1</td><td>0</td><td>0</td><td>0</td><td>0</td><td>0</td><td>0</td></tr>
<tr><td>N4 |val|val</td><td>1</td><td>0</td><td>0</td><td>0</td><td>0</td><td>0</td><td>0</td></tr>
<tr><td>N4 |val|val|val</td><td>157</td><td>1</td><td>1</td><td>1</td><td>1</td><td>1</td><td>1</td></tr>
<tr><td>N4 TOTAL</td><td>159</td><td>1</td><td>1</td><td>1</td><td>1</td><td>1</td><td>1</td></tr>
<tr><td>⋮</td><td></td><td></td><td></td><td></td><td></td><td></td><td>. . .</td></tr>
</table>

*FIG. 13*

PERFORMING ABSTRACTION AND/OR INTEGRATION OF INFORMATION

This application claims the benefit of U.S. Provisional Patent Application No. 61/021,414, filed Jan. 16, 2008, entitled "Structuring, Producing, and using Data About Transactions", which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention relates to abstraction and integration of information, such as of data or software. Abstraction and integration of information can be performed in a wide variety of contexts: For example, abstraction and integration can be performed on data about transactions, such as electronic commerce ("e-commerce") business-to-business (B2B) transactions; more specifically, exemplary implementations involve transaction data in standard and/or proprietary formats.

It would be beneficial to have improved techniques for abstracting and/or integrating information.

SUMMARY OF THE INVENTION

The invention provides various exemplary embodiments, including articles, methods, and systems. In general, the embodiments are implemented in relation to standard-based and/or proprietary abstractions and/or integrations.

These and other features and advantages of exemplary embodiments of the invention are described below with reference to the accompanying drawings.

BRIEF DESCRIPTION OF THE DRAWINGS

FIG. 13 is an excerpt of a seglet/trading partner cross-tab report that could be presented in an implementation of a technique as in FIG. 12.

DETAILED DESCRIPTION

Figure 1:
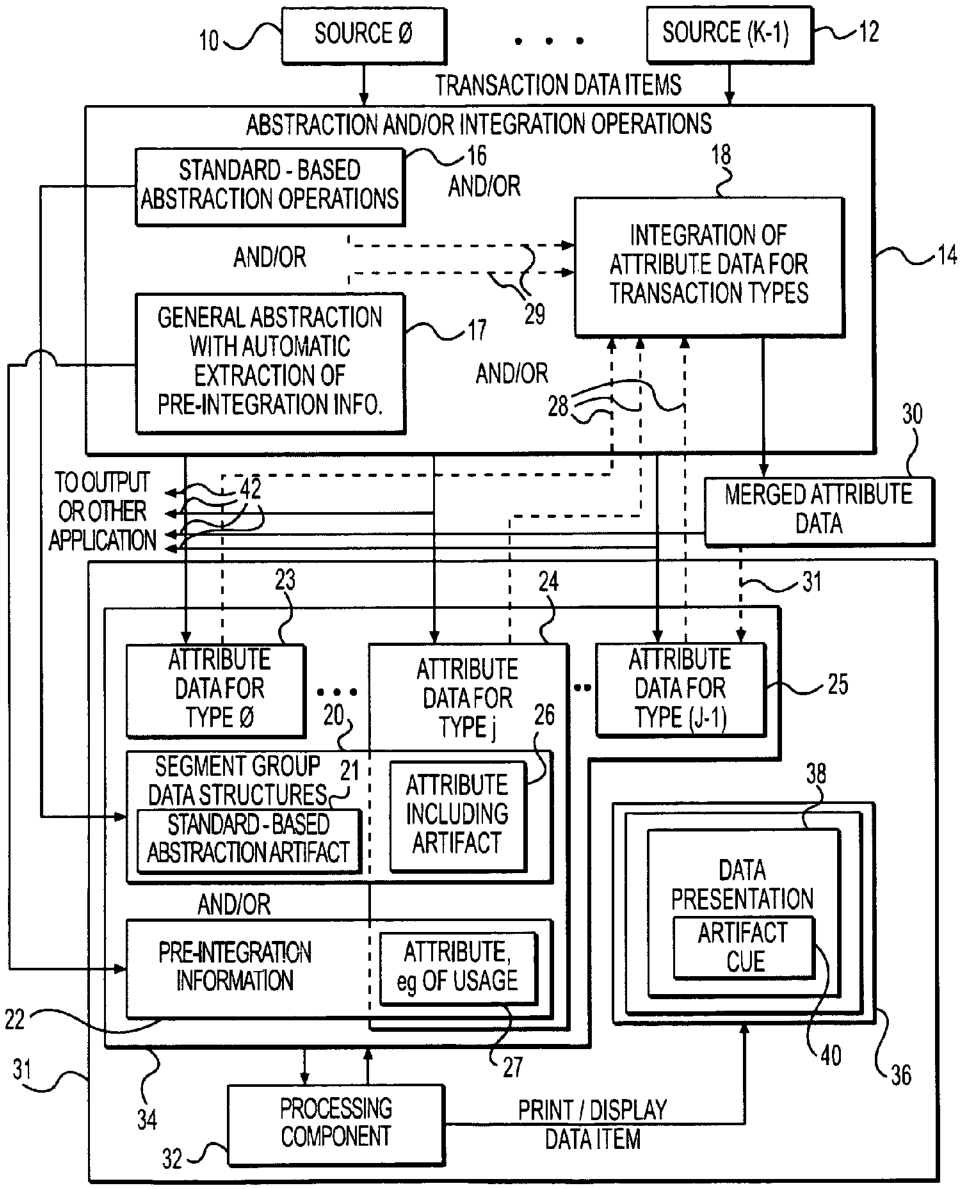
FIG. 1 is a schematic diagram showing ways of performing abstraction and/or integration of information in transaction data items.

In the following detailed description, numeric values and ranges are provided for various aspects of the implementations described. These values and ranges are to be treated as examples only, and are not intended to limit the scope of the claims. In addition, a number of exemplary data items are identified as suitable for various facets of the implementations. These data items are to be treated as exemplary, and are not intended to limit the scope of the claims.

As used herein, an operation performs "abstraction" when it uses a data item ("starting data item") to obtain a different data item ("resulting data item") that omits some information that was in the starting data item. The resulting data item may, however, also include added information that reveals new or additional characteristics of the starting data item, characteristics that could not be obtained by inspection of the starting data item individually—examples of new or additional characteristics that could be revealed by added information include, e.g., an identifier of an applicable group or type of data items or, e.g., an indication of whether a field in the data item is always, sometimes, or never used in data items of the same type or always has the same value in data items of the same type.

As also used herein, an operation performs "integration of information" when it uses input information from two or more different sources to produce integrated information that includes some or all of the input information; for example, the sources might have different conceptual, contextual, and/or typographical representations. Integration of information can be thought of as merging input items of information. Integration of information can be performed on information of various kinds, including, for example, applications and data.

An "application item" is an item that exists in any physical form and that controls operations within a system. Application items can, for example, be implemented in any appropriate combination of software, hardware, and human actions, and a type of operations controlled by an application item is sometimes referred to herein simply as an "application". For example, a business enterprise might employ a supply chain management application, a customer relationship management application, a business intelligence application, and so forth; techniques described below in relation to exemplary implementations are not, however, limited to integration of application items used in business enterprises, and could be applicable to application items used between, among, or within entities of any kind.

Similarly, a "data item" is an item of data that exists in any physical form, such as stored in one or more registers or in memory or in any other digital or analog form within a data processing system or encoded in a signal being transmitted through any form of communication. The term "record", for example, sometimes refers to a data item that includes one or more "fields". Information about data items can, for example, indicate "attributes" of records or of fields, where the term "attribute" refers broadly to any description that the records or fields satisfy, such as information about values that the records or fields can contain or about records or fields that are counterparts or that otherwise correspond in some way; the term "attribute" is sometimes also used to refer to a data structure or other item of data that indicates a value for an attribute.

FIG. 1 shows information sources 10 through 12, illustratively a set of K information sources in which K is two or more, with source 10 illustratively labeled as "Source 0" and source 12 labeled "Source (K−1)". Abstraction and/or integration operations 14 illustratively receive transaction data items from sources 10 through 12, perform abstraction and/or integration using the transaction data items, and produce one or more types of attribute data that can, for example, be provided as output or used in another appropriate way.

Abstraction and/or integration operations 14 include operations that can be characterized as shown in one or more of boxes 16, 17, and 18. Box 16 represents standard-based abstraction operations, which can produce segment group data structures 20 with standard-based abstraction artifacts, such as artifact 21. Box 17 represents general abstraction operations that include automatic extraction of pre-integration information 22. Box 18, on the other hand, represents operations that perform integration of attribute data for transaction types—a "transaction type" could, e.g., indicate whether a transaction data item of that type has a standard-based format or a proprietary format and/or could indicate another type of transaction applicable to all transaction data items of that type, e.g. purchase order, etc.

Operations 14 can also produce attribute data for types of transactions, as illustrated for example by attribute data items 23 through 25, a set of J items, with item 23 labeled "Attribute Data for Type 0" and item 25 labeled "Attribute Data for Type (J−1)", and with item 24 an illustrative item shown in more detail and labeled "Attribute Data for Type j". Item 24 illustratively includes at least one of attributes 26 and 27, each of which is an attribute of transaction type j. Attribute 26 includes a standard-based abstraction artifact resulting from standard-based abstraction operations in box 16 and attribute 27 similarly includes pre-integration information resulting from and an artifact of general abstraction in box 17, such as a usage attribute as described below. Operations in box 18 can be performed on any of items 23 through 25, as suggested by dashed-line arrows 28; on attribute data items directly from operations in either or both of boxes 16 and 17, as suggested by dashed-line arrows 29; or oh attribute data items from other sources. Operations in box 18 produce merged attribute data 30, which could be used in other operations, stored as suggested by arrow 31, presented to a user, transmitted or otherwise provided as output data, or handled in another appropriate way.

In general, the term "transaction" is used herein to refer broadly to any event, whether or not evidenced by a document, that occurs in a given context and about which useful information can be obtained for future use. For example, in an application such as a warehousing system, a unit of work such as a put away action or a pick action is an example of a transaction.

In a commercial context and in some non-commercial contexts, the terms "transaction" and "trading partners" have related meanings: In such contexts, a "transaction" is an interaction between or among entities, such as organizations, parts of organizations, or even individuals; entities participating in a transaction are sometimes referred to herein as "trading partners", but the techniques described herein are not limited to actual trading or commerce, but could be applicable in any context in which integration of information is performed, including transactions between parts of a single organization, all of which therefore fall within the meaning of "trading partners". While many types of interactions can be described as transactions between or among trading partners, including not only actual interactions but also simulated, virtual, or other non-actual interactions, the techniques described herein are especially useful with commercial transactions between actual business entities that communicate electronically through a network such as the Internet or a commercial value added network.

In the e-commerce business-to-business (B2B) community, business documents, which are examples of transactions, are typically exchanged in a common format referred to as a "standard". The standard is typically understood by all parties involved, i.e. by all the trading partners.

In contrast, the term "proprietary" is used herein to refer to any format that is not standard, i.e. is not a common format. A proprietary format need not, however, be private, secret, or subject to ownership in any way, but rather has a meaning similar to one sense of the term "non-standard". Proprietary formats can be applicable not only to data items but also to application items or to other items suitable for integration of information.

In some cases, a data item "almost" satisfies a standard format, meaning that the data item has some proprietary format features that depart from the standard format, but techniques such as those described herein can be used such that the data item can be treated as satisfying the standard format even though it does not. Such data items are therefore sometimes treated herein as if they satisfy the standard format.

A complex transaction can be analyzed as a set of simpler transactions, which can be referred to as "transaction segments" or simply "segments". An "analyzed transaction" is a transaction that has been analyzed as a set of segments.

Some exemplary implementations described herein address problems that arise in handling data items that include information about transaction segments, sometimes referred to herein as "segment data items". Segment data items are typically obtained by analyzing data that includes information about one or more transactions, sometimes referred to herein as a "body of transaction data".

In general, a typical body of transaction data can be analyzed to obtain a multitude of segment data items, but most of the segment data items are unique or match only a few other segment data items. Therefore, it is difficult to find collections of segment data items that can be usefully treated as a group, sometimes referred to herein as "segment types". If useful segment types could be identified and catalogued, then they could serve as a foundation for harvesting commonality among transactions that would otherwise be viewed as or thought of as unique.

Further, even if one finds useful segment types, this is not sufficient to perform many important operations involving combinations of segment types. For practical applications such as map conversion and translation, it is necessary to take into account the various forms of a segment type and also possible variations due to a business' unique practices, sometimes due to requirements of its trading partners.

Some exemplary implementations described herein address these problems with techniques involving data structures. As used herein, a "data structure" is a combination of two or more data items that can be accessed to obtain any of the data items. Numerous types of data structures have been proposed, including concatenations, linked lists, finite state machine data structures, and so forth. Data structures can exist physically in a number of forms, including, for example, stored in a "data storage component", meaning any component that is in a system, article of manufacture, apparatus, or other product and that operates to store data; examples include integrated circuits, random access memories, read-only memories, programmed logic memories, semiconductor memories, magnetic memories, disk drive devices, volatile memory, non-volatile memory, server devices, data memories, program memories, combinations of two or more such components, and so forth. Data structures can also, for example, be transmitted with appropriate signals.

A "transaction data item" is a data item that includes or otherwise indicates information about a transaction between or among trading partners. For example, a transaction data item could indicate a unique identifier of the transaction, the identities and roles of the trading partners, type of the transaction, and so forth. In current practice, transaction data items for commercial transactions, such as for e-commerce B2B transactions, conform to any of a number of standards accepted in a relevant business community, and such a standard is sometimes referred to herein as a "business-accepted standard"; business-accepted standards for electronic data interchange (EDI) include the ANSI ASC-X12 standard, the United Nations EDIFACT standard, and several others, e.g. emerging XML business standards, and it is foreseeable that other business-accepted standards will be developed in the future. Each business-accepted standard includes a set of rules that govern interpretation of a transaction data item based on its format, and such a set of rules is sometimes referred to herein as a "format criterion" because it can be applied to a transaction data item to evaluate whether it is correctly formatted for that standard. Where transaction data items almost satisfy a format criterion, it may still be possible to perform some standard-based operations on them despite departures from the format criterion; for standard-based operations that effectively apply the format criterion, another possible approach would be to modify or relax the format criterion so that the transaction data items satisfy it. The terms "nearly standard" and "almost standard" are sometimes used herein to refer to transaction data items with logical structures that do not fully satisfy a standard's format criterion but that are otherwise structured, e.g. physically, so that operations in a given implementation for transaction data items that satisfy the standard's format criterion can also be successfully performed on the nearly standard or almost standard transaction data items; an example might be a transaction data item that includes an extra field in a segment.

A "transaction segment data item" is a transaction data item that indicates information about a segment of a transaction. Where a complex transaction is analyzed into a set of segments, a set of transaction segment data items with information about all the segments could together indicate information about the complex transaction. Transaction segment data items "result from" analyzed transactions if analysis of the transactions leads to a set of segments about which the transaction segment data items indicate information.

A second data item is "revised" relative to a first data item if the second item is obtained by somehow changing the first data item. For example, parts of the first data item could be replaced, rearranged, deleted, or otherwise modified, or further parts could be added to the first data item, to obtain the second data item. A part of the second data item is "the same as in" the first data item if that part is unchanged, even though its absolute position or position relative to other parts might be changed. A part of the first data item (or first part) is "replaced by" a part of the second data item (or second part) if the second data item is revised from the first, the first and second parts are different, and the series of operations that produced the second data item from the first had the effect of removing the first part and putting the second part in place; in other words, a part can be replaced by another part in various ways, involving various combinations of deletions, insertions, and so forth.

In data processing, a data item can include several smaller data items within it; in one common technique, a data item includes "element fields" and "element delimiters" or simply "delimiters", with each element field having one of a set of element values and with each delimiter having a value that indicates a type of beginning, ending, or other limit of one or more element fields or groups of element fields. For example, a digital data item could include a series of element fields with delimiters at the beginning of the first element field, between each pair of adjacent element fields, and at the ending of the last element field in the series. Just as each element field could have one of a set of element values, each delimiter could have one of a set of delimiter values, each indicating a respective type of delimiters.

The element fields of a transaction segment data item, for example, include fields that include element values of "transaction-related attributes", meaning any of various types of attributes that could apply to a transaction. For example, a transaction segment data item could include a transaction type value identifying a type of transaction; a segment name value indicating a segment name; trading partner value identifying a trading partner; a loop identifier (ID) value identifying a type of loop; a position value indicating a position; and so forth. The term "identifier" is sometimes used herein in the specific sense of an element of type identifier, meaning that it occurs in a standard format and the format treats as having type identifier or an equivalent type that distinguishes it from elements that, for example, are mere values such as quantities, amounts of money, etc., sometimes referred to herein as "non-identifiers".

Some identifiers are referred to herein as "relevant identifiers", meaning that they are relevant in grouping segments of a transaction. Identifiers that are not relevant identifiers are sometimes referred to herein as "irrelevant identifiers"; an example of an irrelevant identifier is ANSI ASC-X12 element 116, postal code, which is of type identifier but has no bearing on segment grouping. In contrast, qualifiers, elements that are coded to describe what information will be submitted in other fields, are in general always relevant identifiers. In some of the implementations described herein, an operator can change identifiers from one of these types to another.

In revising data items that include delimiters that can have more than one value, a "uniform delimiter value" is a delimiter value that replaces two or more delimiter values; for example, if a first delimiter value indicates the beginning of the first element and/or the end of the last element and a second delimiter value indicates a position between elements, a uniform delimiter value could replace each occurrence of the first and second delimiter values. Similarly, a "uniform element value" is an element value that replaces two or more element values. In some contexts, "universal" delimiter values and element values are distinguished from other uniform values, because they are the most general uniform values and can be used to represent any type of delimiter or element value, respectively, while other uniform values represent specific types of delimiter or element values.

Information about a set of data items can be obtained in various ways. For example, a "group" can include a subset of the data items that are similar in some way. One type of similarity is to have "the same" element value for an element, such as the same trading partner element value, meaning that the element values for that element are identical. Another type of similarity is to meet a "similarity criterion", meaning a criterion that distinguishes data items that are similar from data items that are dissimilar. Where data items include uniform delimiter values and uniform element values, a similarity criterion can, for example, "depend on position of one or more uniform delimiter values and/or element values", meaning that the similarity criterion can be applied by an operation that includes comparing one or more positions, where each position is of a uniform delimiter value or a uniform element value; a simple similarity criterion might, for example, test for similarity based on whether the first parts of data items are elements having the same element values and whether the second parts of data items are uniform delimiter values of the same type.

Transaction segment data items that satisfy a similarity criterion are sometimes referred to herein as instances of a "type" of transaction segment data item. A "segment type data item" is a data item that includes information about a type of transaction segment data item. A data structure that includes one or more segment type data items is sometimes referred to herein as a "segment group data structure".

As used herein, the term "system" refers to a combination of two or more parts or components that can perform an operation together. A system may be characterized by its operation; for example, a "data processing system" is a system in which processing of data is performed.

In exemplary implementations described herein, devices, systems, or parts or components of devices or systems may sometimes be referred to as "attached" to each other or to other devices, systems, parts, or components or vice versa; the terms "attached", "attach", and related terms refer to any type of connecting that could be performed in the context. The more generic term "connecting" includes not only "attaching", but also making other types of connections such as electrical connections between or among devices, systems, parts, or components. The term "electrical connection" is used broadly herein, referring to any arrangement or physical connection that permits transfer of signals in electrical, magnetic, and/or electromagnetic form.

Unless the context indicates otherwise, the terms "circuitry" and "circuit" are used herein to refer to structures in which one or more electronic components have sufficient electrical connections to operate together or in a related manner. In some instances, an item of circuitry can include more than one circuit. An item of circuitry that includes a "processor" may sometimes be analyzed into "hardware" and "software" components; in this context, "software" refers to stored or transmitted data that controls operation of the processor or that is accessed by the processor while operating, and "hardware" refers to components that store, transmit, and operate on the data. The distinction between "software" and "hardware" is not always clear-cut, however, because some components share characteristics of both; also, a given software component can often be replaced by an equivalent hardware component without significantly changing operation of circuitry.

Circuitry can be described based on its operation or other characteristics. For example, circuitry that provides input signals or data, such as to a processor, or that receives output signals or data, such as from a processor, is sometimes referred to herein as "input/output circuitry" or "I/O circuitry".

Operations performed using circuitry can also be described based on the manner in which they are performed. For example, an operation that is performed without concurrent human control is sometimes referred to herein as an "automatic" or "automated" operation or as being performed "automatically", while an operation that includes at least some automated suboperations but also includes some suboperations that are performed with concurrent human control is sometimes referred to herein as "partially automated". A system, part, component, or processor is "structured to" operate in a given way if it operated in the given way due to any combination of connections of parts or components within it, hardware within it, software within it, and other structural features within it; more specifically, a system, part, component, circuit, circuitry, or processor is "programmed to" operate in a given way if it operates in the given way due to control of its operation by software within it, whether or not the operation is fully or partially automated.

FIG. 1 also shows system 31, a data processing system that includes processing component 32, data storage component 34, and presentation component 36. In operation, segment group data structures 20, data indicating pre-integration information 22, and an attribute data item represented by any of boxes 23 through 25 are stored by component 34, and processing component 32 can access a data item in any of them and use it to provide data presentation 38 through presentation component 36. For example, as suggested in FIG. 1, processing component 32 could cause data presentation 38 by using a data item (e.g. item 24) to produce display data that can be provided to any of a wide variety of display devices or to produce print data that can be provided to any of a wide variety of printing devices.

Various types of operations can be performed on transaction data items that satisfy or almost satisfy format criteria. For example, one type of operations includes "standard-based" operations, referring herein to any of various operations that depend on a standard format that a transaction data item satisfies or almost satisfies. A standard-based operation could be performed on a starting transaction data item to obtain one or more other resulting transaction data items that satisfy or almost satisfy the same format criterion or a different format criterion. In other cases, a standard-based operation on a transaction data item obtains a resulting data item that does not satisfy any standard format criterion but includes some or all of the information from the transaction data item; such a resulting data item is referred to herein as a "non-standard transaction data item".

Various types of abstraction operations, as described above, can be performed on transaction data items: For example, "standard-based abstraction operations" can be performed on transaction data items that are at least partially in a standard format; also, "general abstraction operations" can be performed not only on transaction data items in a standard format but also on non-standard transaction data items. An abstraction operation can obtain information about a specific transaction or about the specific starting data item. Even though the abstraction operation omits some information from the starting data item when it obtains the resulting data item, the resulting data item may include added information such as of the types mentioned above; further, in the context of a transaction, the resulting data item could indicate whether a field in the data item is always, sometimes, or never used in data items of the same type or always has the same value in data items of the same type, either for a specific trading partner or for all trading partners.

A simple standard-based abstraction operation, for example, could delete a field or a delimiter or replace the value in a field or a delimiter with a less-informative value, the position or other characteristics of the field or field delimiter in each case depending on a standard format. A more complex abstraction operation could be performed in stages; if one stage obtains a non-standard transaction data item, for example, a following stage could use the non-standard transaction data item to obtain a further resulting data item, and so forth. A complex abstraction operation could include one or more stages that obtain intermediate data items with increased information, as long as the net result of the entire abstraction operation is a resulting data item that omits some of the information in the starting data item.

A "standard-based abstraction artifact" is a feature of a data structure or other data item that results from performing a standard-based abstraction operation on another data structure or data item. As used herein, "pre-integration information" is also an artifact of an abstraction operation that extracts such information from transaction data items; as used herein, "pre-integration information" includes any of various types of information that are useful in performing integration and may also have other uses, as suggested below. Various examples of standard-based abstraction artifacts and pre-integration information are illustrated and described below.

In the exemplary implementation of FIG. 1, data presentation 38 includes artifact cue 40, a perceptible feature that indicates the presence of an artifact, such as a standard-based abstraction artifact in attribute 26 or pre-integration information in attribute 27. Because of the wide variety of ways in which data structures and other data items can be encoded, stored, and otherwise implemented, a specific standard-based abstraction artifact or an item of pre-integration information may be most easily observed by accessing with a processor programmed to convert to human-readable form, such as printed or displayed form. In general, a standard-based abstraction artifact is equivalent to replacement of part of a data item, such as with a less informative or more informative replacement part; an artifact cue might indicate that replacement has occurred, for example, by presenting characters indicating that a part that satisfied a standard format has been replaced by another part that does not satisfy the standard format in some way. In general, the term "replace" is used herein to refer to any operation whose result is equivalent to a replacement, whether accomplished by one or more insertions, deletions, combinings, or other modifications and regardless of the order in which modifications are made; as will be understood from the description below, replacement can be performed automatically or manually or by any suitable combination of automatic and manual operations. Similarly, an item of pre-integration information generally provides information that can facilitate comparison of records and/or fields during integration, such as about values a field has in a collection of transaction data items being analyzed.

Some exemplary implementations described herein address problems that arise in abstraction and integration of information from records or other items that include actual element values, such as values resulting from actual business transactions. Such abstraction and integration is typically very complex, such as because unusual relationships can occur between and among actual element values and because diverse formats may come into play. Further, integration of such information is typically performed manually through brute force, an inefficient approach, especially with long-lived systems where problems arise with old code or data that is inaccurate, obsolete, or logically incomplete; also, such an approach may depend on quality of code and logic in legacy systems and on intimate knowledge of how the system is designed and operated, which may be unknown or undocumented.

Some exemplary implementations described herein address these and related problems, as suggested above in relation to FIG. 1. For example, some general abstraction operations described herein automatically extract pre-integration information that indicates relationships between fields and/or records without requiring knowledge of old code or data of legacy systems other than proprietary formats. Also, some integration operations herein operate on transaction type attribute data to obtain merged attribute data, and similarly do not require such knowledge.

As suggested by the words "AND/OR" between each pair of boxes 16, 17, and 18 and by dashed-line arrows 29, abstraction operations as in boxes 16 and 17 and integration operations as in box 18 can be performed separately or together in any appropriate combination. A given implementation can therefore include one, two, or all of the operations in boxes 16, 17, and 18, and operations as in boxes 16, 17, and 18 can be implemented as a single combined operation.

Attribute data items 23, 24, and 25, and merged attribute data 30 in FIG. 1 are all examples of "transaction type attribute data", a general term that is used herein to refer to data with information about attributes of one or more transaction types. In addition to information about transaction types considered separately, transaction type attribute data can include, for example, information about relationships between two or more types, as described herein in relation to some exemplary implementations. The related terms "type attribute data item" and, more simply, "attribute data item" refer to items of data that include transaction type attribute data, whether for one or more transaction types.

As suggested in FIG. 1, each of attribute data items 23, 24, and 25 can be produced by an appropriate combination of abstraction and/or integration operations 14, as merged attribute data 30 is. Also, as shown by arrows 42, any of items 23, 24, and 25 and data 30 could be provided as output, such as to a display, or to another application, such as one of the applications described herein.

Figure 2:
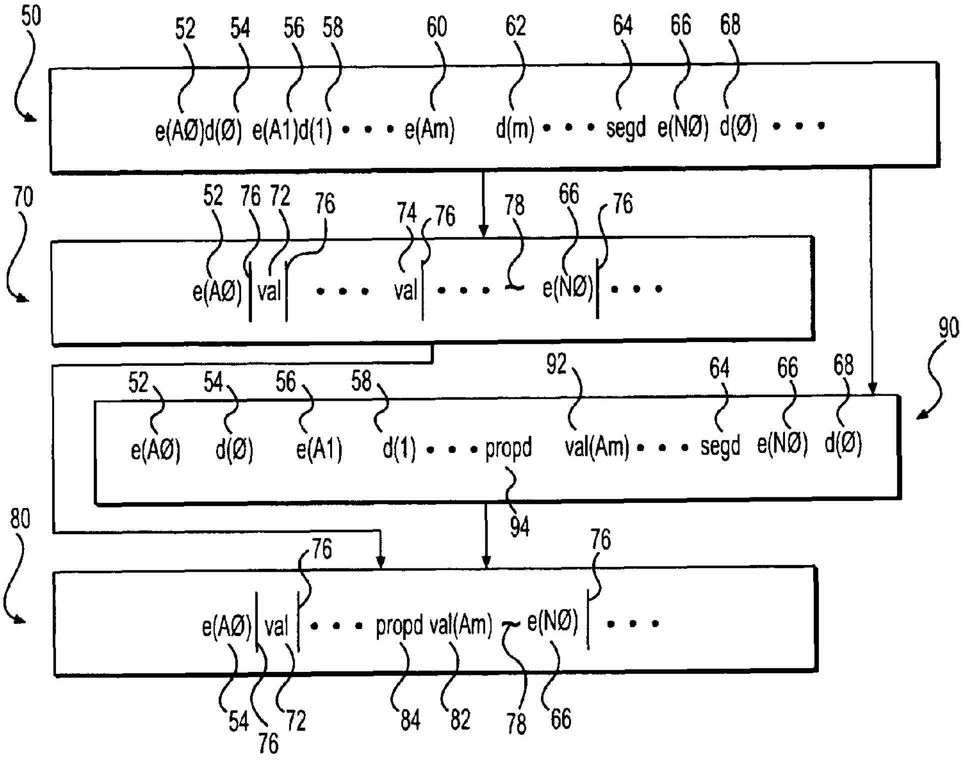
FIG. 2 is a schematic flow diagram showing stages in using a transaction segment data item to obtain data including standard-based abstraction artifacts.

FIG. 2 illustrates several examples of standard-based abstraction artifacts, showing how they could arise and also how they could appear as artifact cues in a visual presentation. In the exemplary implementation of FIG. 2, the underlying transaction data includes character codes that can be directly converted into visually presented characters. This is only one of a multitude of ways in which transaction data could, however, be stored and used to provide a presentation, and any other suitable techniques could be used; it is foreseeable that many such techniques will be developed in the future, all within the scope of this invention.

Box 50 in FIG. 2 shows a visually presented sequence of characters from a body of transaction data, a sequence that satisfies a business-accepted standard such as the ANSI ASC-X12 standard, the United Nations EDIFACT standard, or emerging XML business standards. The characters in box 50 are not, however, actual characters that one would find in such a sequence, but rather are names indicating types of character streams, and each such name is separated from adjacent names by a space. Name 52, for example, "e(A0)," identifies an element value in a field; name 54, "d(0)," identifies a following delimiter value; name 56, "e(A1)," identifies another element value; name 58, "d(1)," identifies another delimiter value; and so forth for names 60, 62, 64, 66, and 68. The names in box 50 are grouped into segments, with segment A including names 52, 54, 56, 58, 60, and 62, as well as additional names indicated by ellipses between name 58 and name 60; segment N, where N is the number of segments in box 50, similarly includes names 66 and 68 as well as a number of additional names indicated by the ellipses following name 68. Name 64, "segd," is the name of a segment delimiter between segment N and the preceding segment, and each pair of adjacent segments can be similarly separated by a segment delimiter. Ellipses between names 62 and 64 represent (N−2) segments that are displayed in box 50 but not shown in FIG. 2.

Box 70 shows another visually presented sequence of characters, but this time a sequence that does not satisfy a business-accepted standard as described above. Instead, the sequence in box 70 results from a standard-based abstraction operation on transaction data that indicated the sequence of characters presented in box 50.

Although a subset of the names in box 70 are the same as in box 50, and therefore have the same reference numerals, several names have been changed as a result of replacement operations. For example, names 56 and 60 have been replaced by uniform element values 72 and 74, respectively, with uniform element values 72 and 74 being the same and therefore both shown simply as the universal element value "val." Similarly, each of names 54, 58, 62, and 68 has been replaced by an instance of uniform delimiter value 76, shown simply as "j." Also, name 64 has been replaced by another uniform delimiter value, specifically universal segment delimiter value 78, shown simply as "~." These uniform values are all replacement artifacts, examples of standard-based abstraction artifacts that would not appear in a sequence that satisfies the business-accepted standard applicable to the sequence in box 50. As can be seen, the standard-based abstraction operation that produced the sequence in box 70 reduced information by replacing names with less-informative uniform values.

Box 80 shows another visually presented sequence of characters, after another standard-based abstraction operation, which, in this case, increased information in the sequence of characters. The operation increased information by replacing uniform value 74 in box 70 with specified value 82, shown as "val(Am)", thereby increasing the amount of information in the sequence of characters; the same operation also replaced the following delimiter with a uniform delimiter value "propd". For example, if the transaction on which the sequence of characters is based treats an element in the position of uniform value 74 differently than transactions between other trading partners would, specified value 82 can indicate the specific meaning used in the transaction between particular trading partners, a type of information sometimes referred to herein as "proprietary information." The delimiter value "propd" can be a universal proprietary delimiter value indicating that value 82 has been amended to contain proprietary information. In an actual implementation, the delimiter value "propd" could be embedded in a series of items that together form the value "val(Am)", such as "val (propd) val(pi)", where "val(pi)" is a value that includes proprietary information.

Although the sequence from box 50 to box 70 to box 80 first reduces information and then increases information, the sequence of characters in box 80 could alternatively be obtained from the sequence in box 50 by first increasing information and then decreasing it, another type of standard-based abstraction operation.

Box 90 illustrates an example in which information has been added to the sequence of characters in box 50 by initially replacing name 60 with specified value 92, also shown as "val(Am)" and by replacing name 62 with uniform delimiter value 94, shown as "propd"; then, another standard-based abstraction operation can be performed on the sequence of characters in box 90 like that performed on the box 50 sequence to obtain the box 70 sequence, again producing the Sequence of characters in box 80.

Figure 3:
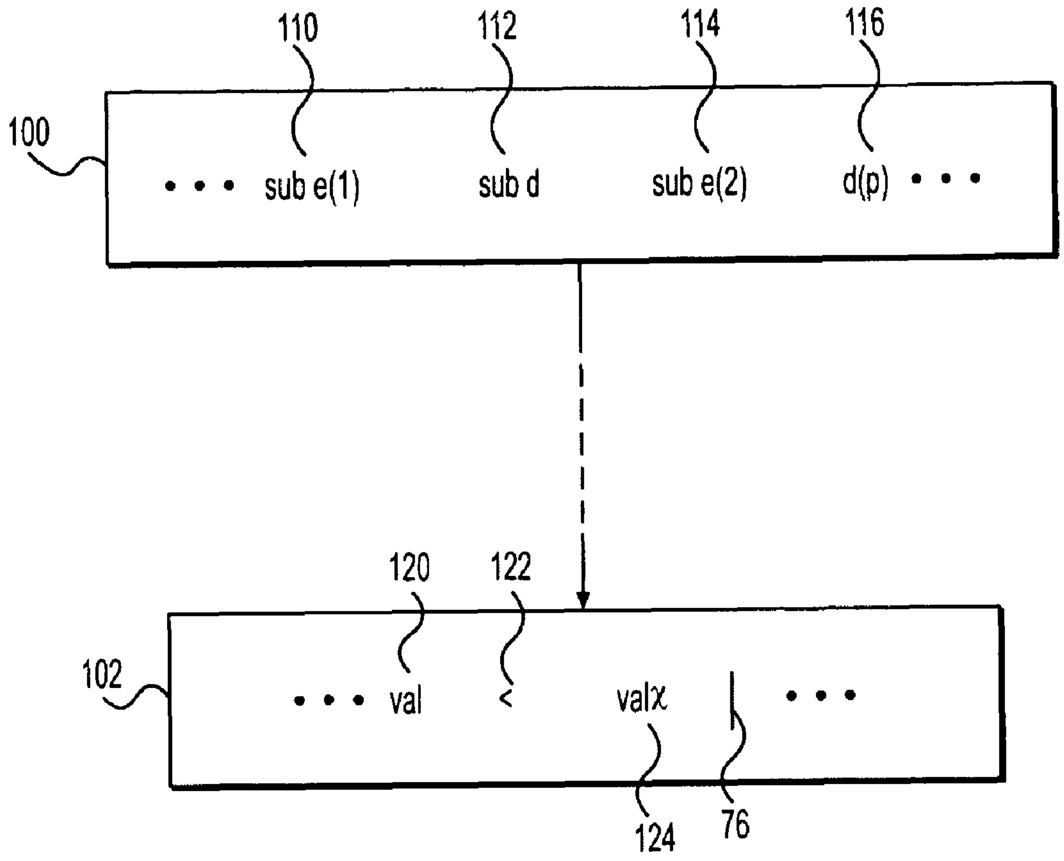
FIG. 3 is another schematic flow diagram showing stages in using a transaction segment data item to obtain data including standard-based abstraction artifacts.

FIG. 3 illustrates additional examples of standard-based abstraction artifacts, examples that could occur within the exemplary implementation of FIG. 2. Box 100 shows an excerpt of a visually presented sequence of characters that could occur within the sequence in box 50 in FIG. 2, while box 102 illustrates an excerpt that could occur within the sequence in box 80 in FIG. 2. As suggested by the dashed arrow from box 100 to box 102, various operations could be performed to obtain the sequence in box 102 from the sequence in box 100, including operations similar to those described above in relation to FIG. 2.

Box 100 illustrates a sequence of characters within an element that includes two subelements. Name 110, "sube(1)," identifies a first subelement value in the element; name 112, "subd," identifies a subelement delimiter value; name 114, "sube(2)," identifies a second subelement value in the element; and name 116, "d(p)," identifies a delimiter value appropriate for the end of an element. The excerpt in box 100 could occur, for example, within segment A in box 50.

In box 102, name 110 has been replaced by uniform element value 120, which is the same as uniform element value 72 in box 80, shown simply as "val." Similarly, name 112 has been replaced by a uniform delimiter value, specifically uniform subelement delimiter value 122, shown simply as "<." Name 114 has been replaced by uniform element value 124, shown as "valx," indicating that it is a special uniform element value inserted by a user to replace an instance of the uniform element value "val." Finally, name 116 has been replaced by an instance of uniform delimiter value 76, shown as "j" as in FIG. 2.

The standard-based abstraction artifacts illustrated in FIGS. 2 and 3 are only a few of a wide variety of possible types of artifacts. Furthermore, the specific ways of representing uniform values are merely illustrative, and any appropriate combination of characters or other items of data could be used in encoding uniform values. Also, many other standard-based abstraction operations in addition to those illustrated and described in relation to FIGS. 2 and 3 could be implemented, some examples of which are described below.

Figure 4:
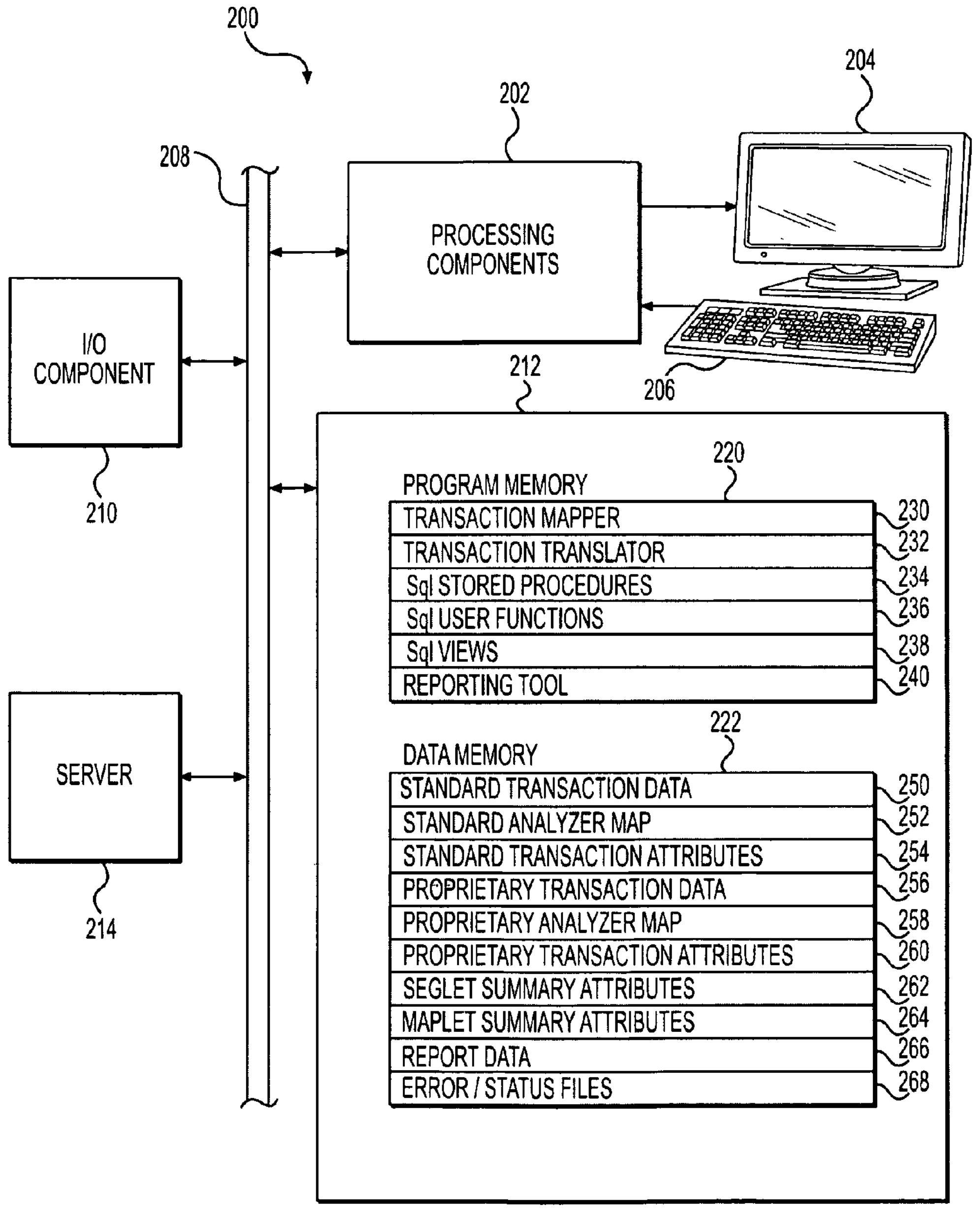
FIG. 4 is a schematic block diagram showing an exemplary implementation of a system that can perform abstraction and/or integration operations on transaction data items as in FIG. 1.

FIG. 4 shows system 200, an example of a system in which techniques as described herein can be implemented, such as to produce and use segment group data structures, pre-integration information, and transaction type attribute data that include standard-based abstraction artifacts or pre-integration information and to perform integration of transaction type attribute data. As described below, system 200 can be implemented with a number of processing components and with operations that are partially automated, but it is foreseeable that system 200 can be implemented with a single processing component in a nearly automated implementation.

System 200 illustratively includes processing components 202, which can include one or more central processing units (CPUs), of which at least one illustratively has I/O circuitry that provides a user interface, such as with display 204 and keyboard 206. In addition to I/O circuitry that provides any appropriate user interface, each CPU can also have appropriate memory and peripherals and can be connected to various other I/O circuitry or other components through bus 208 or another suitable network or other interconnection structure, but a wide variety of other architectures could be employed, including any appropriate combination of hardware and software, as well as specialized hardware components such as application specific integrated circuits (ASICs) for one or more of the illustrated components or in place of a software component executed by a CPU in processing components 202.

System 200 also includes input/output (I/O) component 210, memory 212, and server 214, all connected to bus 208. System 200 can include various other components (not shown) connected to bus 208. In addition to connections through I/O component 210 by which signals can be provided to and received from external devices, bus 208 can also be connected directly to components outside of system 200, providing yet another type of I/O circuitry.

I/O component 210 is an example of I/O circuitry that permits CPUs in processing components 202 to communicate with a wide variety of external components, and such communication can be performed in a wide variety of ways. In particular, in an implementation in which system 200 is being used by a vendor to provide services to a customer engaged in e-commerce B2B transactions, customer data of various kinds, some of which are described below, can be received through I/O component 210, such as through a secure connection or other communication link. Results of operations performed by system 200 can similarly be delivered to a customer through I/O component 210.

Memory 212 illustratively includes program memory 220 and data memory 222, although instructions for execution by server 14 or by each CPU in processing components 202 and data accessed during execution of instructions could be provided in any suitable way, including through server 214 or through external devices or components. Components stored in program memory 220 illustratively include transaction mapper 230, transaction translator 232, Sql stored procedures 234, Sql user functions 236, Sql views 238, and reporting tool 240. Transaction mapper 230 could be implemented, for example, with Sybase ECMap; transaction translator 232 with Sybase ECGateway; Sql stored procedures 234, Sql user functions 236, and Sql views 238 with commercially available Sql software such as from Microsoft Corporation or Oracle Corporation; and reporting tool 240 with any of various commercially available software products, such as Crystal Reports or Microsoft Business Objects. In one successful implementation, an outsourcing system is also stored in program memory 220, providing user interface features, but a suitable user interface could be provided in any appropriate way, such as through a main routine. The components stored in program memory 220 rather than all being separate, could be combined or differently divided, and various alternative or additional programs could be included.

Data in data memory 222 illustratively include standard transaction data 250, standard analyzer map 252, standard transaction attributes 254, proprietary transaction data 256, proprietary analyzer map 258, proprietary transaction attributes 260, seglet summary attributes 262, maplet summary attributes 264, report data 266, and error/status files 268, but could include various alternative or additional items of data and data structures accessed by server 214 or a CPU in processing components 202.

An Internet based SAAS (software as a service) or client/server implementation is contemplated: For example, bus 208 or another interconnecting component could be connected to the Internet through I/O component 210; a customer's local system (not shown) could include processing components analogous to components 202 that are also connected to the Internet and that provide a user interface with an Internet browser such as with display and keyboard analogous to display 204 and keyboard 206; the Internet browser itself or other client software executed in the customer's local system and responsive to the Internet browser could submit requests for abstraction and/or integration operations to system 200 through the Internet and I/O component 210; and server 214 could respond by performing the requested operations and providing results back through the Internet to the customer's local system, accessing instructions and data in memory 212 as appropriate.

Figure 5:
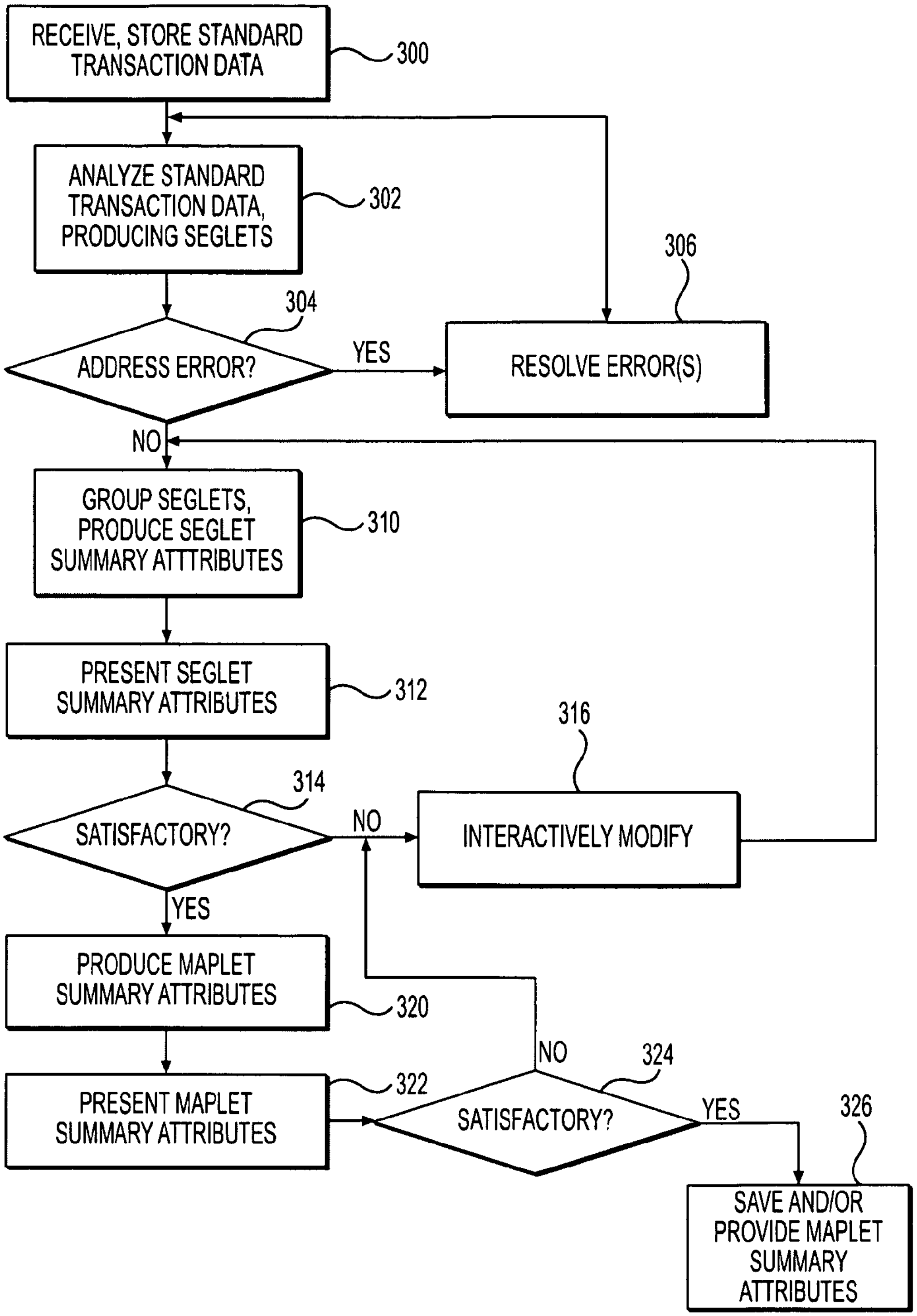
FIG. 5 is a flow chart showing operations in an exemplary partially automated implementation using a system as in FIG. 4 to produce segment group data structures with standard-based abstraction operations.

FIG. 5 illustrates one way in which system 200 can be operated to produce segment group data structures stored in a data storage component such as data memory 222. The segment group data structures can include information about types of transaction segment data items and can also include standard-based abstraction artifacts and pre-integration information. The operations in FIG. 5 are, in general, controlled by a human operator, and are therefore only partially automated.

In response to an operator request, the operation in box 300 receives and stores standard transaction data 250, which can be received through I/O component 210 and can be stored in data memory 222 or in server 214. More specifically, standard transaction data 250 includes a body of transaction data that is at least partially in one or more standard formats such as ANSI ASC-X12, EDIFACT, or emerging XML business standards; in practical implementations, however, standard transaction data 250 is at least partially non-compliant with any of the standard formats.

The operation in box 300 can also receive and store standard analyzer map 252, although map 252 can be a general component that is useful for all standards and therefore can remain in memory for a number of sessions rather than being received and stored each time the operation in box 300 is performed. Map 252 can be implemented, for example, as a data structure that can be created by commercially available mapping software such as Sybase ECMap and executed by commercially available translation software such as ECGateway or other suitable EDI mapping and translation software in performing standard-based abstraction operations as described in greater detail below.

In general, the term "map" is used herein to refer to a data structure or other item of data that can be used to produce one type of data, sometimes referred to as "output", from another, sometimes referred to as "input". EDI mapping software such as ECMap is typically coupled with a "run-time engine", such as ECGateway, that "executes" a suitable map, therefore referred to as an "executable map". An executable map that receives input data in a standard format is typically referred to as an "inbound map", while an executable map that provides output data in a standard format is typically referred to as an "outbound map". An "any-to-any map" is an executable map that, in response to input data in any of a set of input formats, can be executed to obtain information about the input data that is independent of its format; the any-to-any map can also use the information about the input data to produce output data in any of a set of output formats, possibly the same as the set of input formats.

The operation in box 300 can also receive parameters that are manually entered by an operator. For example, the operator can indicate the relative directional flow (inbound or outbound) or other features of standard transaction data 250.

In response to another operator request, the operation in box 302 uses standard transaction data 250 and standard analyzer map 252 to produce standard transaction attributes 254, including "seglets" and initial transaction type attribute data; the term "seglet" is used herein to refer to an item of data that includes information about a type of transaction segment data item and that results from a standard-based abstraction operation. In other words, standard transaction attributes 254 can include a list of seglets resulting from analysis of standard transaction data 250 by mapping software in accordance with map 252. In addition to omitting information from transaction segment data items, however, the standard-based abstraction operation in box 302 also adds information that can reveal new or additional characteristics of transaction segment data items: For example, information in seglets about types of transaction segment data items is an example of added information; automatically extracted pre-integration information, described in greater detail below, is another example.

Initial transaction type attribute data produced in box 302 can, for example, be a data structure or other appropriate set of one or more attribute data items in which attributes of transaction types can be included after they are obtained. For efficiency, initial transaction type attribute data for a given transaction type can be created and stored in standard transaction attributes 254 whenever information about an attribute of that type is first obtained; then, when additional information about attributes of that type is obtained, the additional information can be used to update the stored version of the transaction type attribute data in standard transaction attributes 254, so that, when abstraction operations are completed, standard transaction attributes 254 will include the most recently updated version of the attribute data item, such as attribute data items 23, 24, and 25 (FIG. 1).

Several specific examples of transaction type attributes have been found to be useful in integration, and are therefore examples of pre-integration information as described above in relation to FIG. 1, and could be automatically extracted in box 302, such as in the way described below in relation to FIG. 6. Some attributes may be characterized as "usage attributes" because they indicate how a specific field or data type of a record is used in a given body of transaction data; examples include an attribute indicating whether a field always has the same value (i.e. a "hard coded" field), is never used to hold a value (i.e. an "empty" field), or has some other concisely described combination of values. These and other types of attributes could also indicate a scope within which an attribute holds, such as transaction scope or trading partner scope. These and other types of pre-integration information can be used for purposes other than integration, such as analyzing data to reduce size, e.g. by discovering fields or data types that are always empty and therefore can be eliminated.

In addition to seglets and initial or updated transaction type attribute data, standard transaction attributes 254 can also include a list of elements and a list of seglets and envelopes, each of which can be implemented as a table listing information from the transactions specified by standard transaction data 250. In an exemplary implementation, the element table has the columns listed in Appendix A, while the seglet/envelope table has the columns listed in Appendix B.

In addition, the operation in box 302 can provide an error report indicating whether any errors occurred in analyzing data 250 and, if so, listing the errors. The error report can, for example, be saved in error/status files 268 and can be presented to the operator on display 204. Appendix C shows an example of an error/status report with two examples of error lists, one with no errors and another with ten errors, and each ending with a final status line.

When the operator views the error report, the operator can decide, as illustrated by box 304, whether to address any of the error conditions, and can then indicate, such as by keystrokes on keyboard 206, the error or errors to be addressed. In box 306, the operator can interactively resolve one or more of the errors, using keyboard 206 and display 204. The user interface may, for example, allow the operator to find sources of problems in standard transaction data 250 and make modifications allowing analysis in box 302 without errors or with fewer errors.

When all error conditions have been resolved or when the operator decides in box 304 not to address any further error conditions, the operator can continue to box 310, in which seglets from box 302 are automatically grouped to reduce redundancy in various ways, and seglet summary attributes 262 are produced; these operations can be performed by calling procedures within Sql stored procedures 234 and Sql user functions 236, which in turn reference data in Sql views 238. By reducing redundancy, the operation in box 310 may also omit information, and may therefore include an abstraction operation. The operation in box 310 can also, however, add information to seglet summary attributes, such as further information about types of transaction segment data items. The operation in box 310 can also, as in box 302, obtain information about attributes of transaction types, and can therefore create and store initial transaction type attribute data in attributes 254 or can update previously created transaction type attribute data in attributes 254, as described above in relation to box 302.

The operation in box 310 is computationally intensive for a typical body of transaction data, but when it is complete, the resulting seglet summary attributes 262 can be understood by a human operator. Therefore, the operation in box 310 can also make a call to reporting tool 240, which can convert seglet summary attributes 262 to a viewable report form and can save the viewable report in report data 266.

Automatically or in response to an operator request, the viewable report form of seglet summary attributes 262 from report data 266 can then be presented to the operator on display 204, in box 312. The operator can review seglet summary attributes 262 as presented and decide, as shown in box 314, whether they are satisfactory.

An experienced, sophisticated, or expert operator who is knowledgeable about EDI will be able to identify several types of problems in seglet summary attributes 262. For example, the operator will see seglets whose segment names indicate that they should have a different combination of fields than shown; also, an experienced operator will see some element values that can advantageously be changed from a "relevant identifier", such as "sube(2)" in FIG. 3 to a less specific, but different, uniform value such as "valx". Furthermore, a sophisticated operator will notice underlying EDI process problems or defects in data, such as lack of a data item in an entry.

If the operator decides that the seglets in seglet summary attributes 262 are not satisfactory, the operator can interactively modify seglets and/or data in box 316, using display 204 and keyboard 206. Although interactive modifications could be implemented in many ways, one successful implementation allows the operator to insert, delete, or modify items in a seglet by calling a procedure within Sql stored procedures 234 that, in turn, calls functions in Sql user functions 236 to perform the requested modification. Similarly, the operator can request changes in standard transaction data 250 with calls to Sql stored procedures 234 that, in turn, call Sql user functions 236 to make the requested modifications.

In a simple example, the sophisticated operator may know that the seglet "N3|" should include at least one element, and can therefore request that it be changed to "N3|val." Similar operations could be performed to remove extra element values or to change, for example, the second element in all occurrences of a certain seglet to valx; a useful example of the latter operation would be to change a relevant identifier representing the unit of measure to "uom" to indicate a unit of measure—as explained in greater detail below, it is often useful to treat all identifiers as relevant and then allow the sophisticated operator to change an identifier to be treated as an irrelevant identifiers as appropriate, such as to "valx," "uom," and so forth. More generally, the operator can request insertion, deletion, or change of one or more characters in a seglet.

As noted above, a sophisticated operator can also detect underlying EDI process problems or defects in data. While some such problems cannot be corrected without changing the underlying EDI processes, other such problems can be corrected by modifying seglets in the manner described above.

After the operator makes a modification to standard transaction attributes 254 in box 316, the user interface can proceed to box 310 to propagate the modifications into an updated version of seglet summary attributes 262. Modifications made in box 316 are then reflected in an updated report of seglet summary attributes 262 that is prepared and presented in box 312.

When the presentation in box 312 is satisfactory, the operator can instead, in box 314, call a procedure in Sql stored procedures 234 that, in turn, calls one or more of Sql user functions 236, to perform the operation in box 320. The operation in box 320 automatically groups seglets in seglet summary attributes 262 to produce "maplets" and to produce maplet summary attributes 264; as used herein, the term "maplet" refers to an item of data that includes information about seglets in seglet summary attributes 262 that meet a given seglet specification. The operation in box 320 may also omit information, and may therefore include a standard-based abstraction operation. The operation in box 320 can also, however, add information to maplet summary attributes, similarly to boxes 302 and 310. The operation in box 320 can also, as in boxes 302 and 310, obtain information about attributes of transaction types, and can therefore create and store initial transaction type attribute data in attributes 254 or can update previously created transaction type attribute data in attributes 254, as described above in relation to box 302.

The operation in box 320 could apply seglet specifications that indicate, for example, direction (e.g. incoming or outgoing), transaction type (e.g. purchase order, invoice, etc.), trading partner, version, and segment name; although seglets collected in a maplet are often all the same type of segment, they need not always be; for example, where a business sends both debit invoices and credit invoices to the same trading partner, segments from both types of invoices can be included in the same maplet, in effect creating a new type of transaction combining more than one type of document. All the seglets that satisfy the specification can then be associated into an item of data to produce a maplet; in one successful implementation, seglets satisfying the same specification are sorted in alphabetical order and uniform segment delimiter values are inserted between them and concatenated with a maplet ID or descriptor to produce a maplet. Code for such an implementation is attached as Appendix D.

The operation in box 320 could be implemented in various other ways: With a more advanced analysis operation in box 302, it might also or alternatively be possible to apply seglet specifications that indicate other items of information, such as seglet transaction section (header, detail, summary), position, loop ID, and so forth. For example, since position and loop ID are not in standard transaction data 250 or in the header with which data 250 is received, but can only be determined by reference to the appropriate standard, e.g. ANSI ASC-X12, EDIFACT, or emerging XML business standards, this might be done with a map to keep track of position in the standard and by obtaining position and loopID at each position in the standard using the transaction type and version.

The operation in box 320 can also make a call to reporting tool 240, which can convert maplet summary attributes 264 to a viewable report form such as a list of maplets that can be understood by a human operator. Reporting tool 240 can save the viewable report in report data 266. Automatically or in response to an operator request, the viewable report form can then be presented to the operator on display 204, in box 322. The operator can review maplet summary attributes 264 as presented and decide, as shown in box 324, whether they are satisfactory.

An experienced, sophisticated, or expert operator who is knowledgeable about EDI will be also able to identify several types of problems in maplet summary attributes 264, such as problems similar to those described above in relation to seglet summary attributes 262. If the operator decides that the maplets in maplet summary attributes 262 are not satisfactory, the operator can again interactively modify seglets and/or data in box 316, as described above.

When the presentation in box 322 is satisfactory, the operator can instead, in box 324, call a procedure in Sql stored procedures 234 that, in turn, calls one or more of Sql user functions 236, to perform the operation in box 326; the operation in box 326 could also or alternatively be implemented as part of box 320. The operation in box 326 automatically saves maplet summary attributes 264 in an appropriate location, such as in memory 210 or server 214 or provides maplet summary attributes 264 through I/O component 210 in an appropriate form for a customer's use.

In a beneficial variation, the operation in box 326 can also perform automated operations that reduce the number of maplets explicitly represented in maplet summary attributes 264 for each type of maplets, thereby making it easier to find problems in attributes 264 and also easier to perform conversions using attributes 264. For example, the operation in box 326 can go through all maplets of a given type, finding the maplet with the greatest number of seglets (or, if more than one have the greatest number, the top maplet having that number), which is then treated as a "master maplet", i.e. a maplet that is a superset of maplets. The operation in box 326 can add an initialized list of maplets to the master maplet and can then go through all other maplets of the same type to find ones that contain only subsets of the seglets in the master maplet; if another maplet contains such a subset, its explicit representation is removed from attributes 264, and an identifier of it is added to the master maplet's list of included maplets. When all maplets of the same type have been handled in this way, the operation in box 326 can then find the next master maplet of that type, and so forth until all maplets of the type are either explicitly represented as master maplets or are on a master maplet's list of included maplets.

As used herein, a first maplet can be "included" in a second maplet, such as a master maplet, in any of a wide variety of ways, possibly including ways that are not foreseeable: Currently available ways of including a first maplet in a second maplet include a table indicating maplets included in the second maplet; a list of maplets included in the second maplet; a link, pointer, handle, or other association between the first and second maplets; a combination of the above; and so forth. For example, each maplet could have a maplet table with a column with a pointer to its master maplet, e.g. a master maplet ID; similarly, the master maplet could have a master maplet table with details of the master maplet's attributes, which would therefore be available when the maplet table of one of its included maplets is accessed. "Including" a first maplet in a second maplet refers to an operation that causes the first maplet to be included in the second maplet in any of the ways described above, including ways that are not foreseeable.

Although the technique in FIG. 5 produces at least two useful types of segment group data structures that are stored in a data storage component and that include standard-based abstraction artifacts, i.e. seglet summary attributes 262 and maplet summary attributes 264, the technique of FIG. 5 could be modified in various useful ways. For example, it could be extended to handle transaction data items in proprietary formats.

Figure 6:
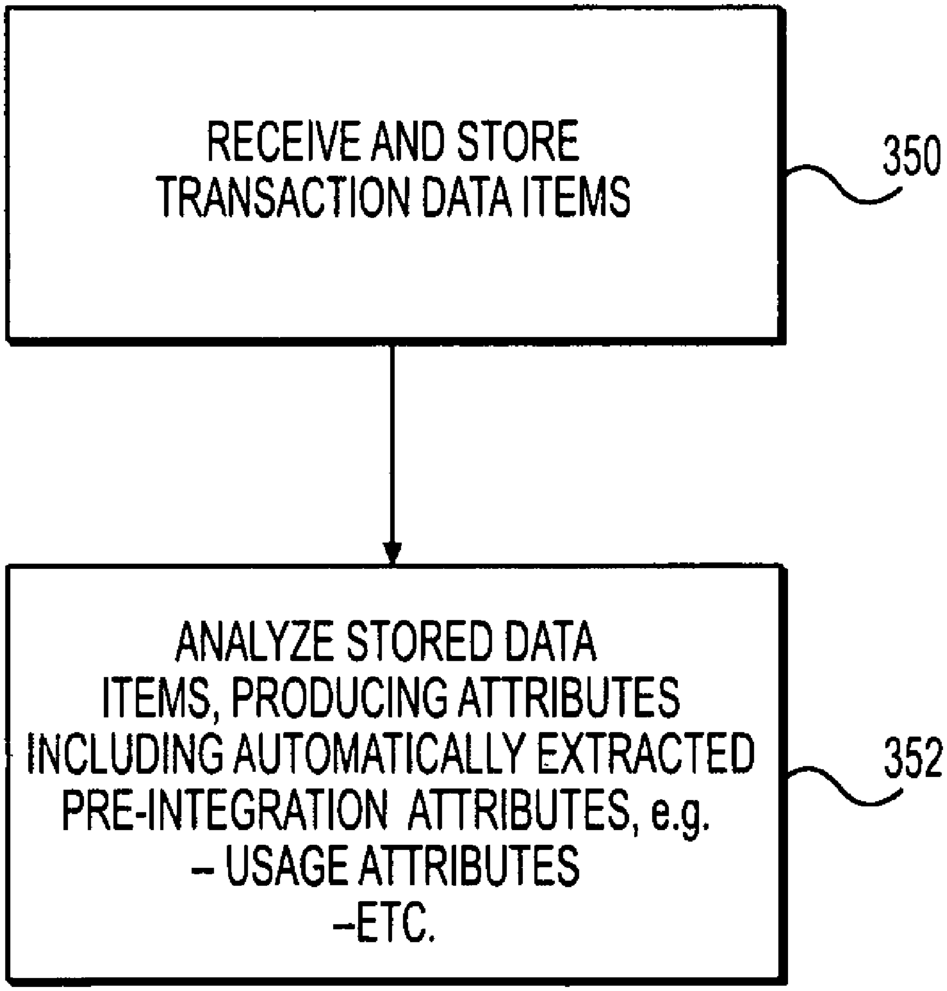
FIG. 6 is a flow chart showing operations in an exemplary partially automated implementation using a system as in FIG. 4 to perform abstraction that includes automatically extracting pre-integration attributes.

FIG. 6 illustrates a general abstraction technique that can operate a system similar to that in FIG. 4 to perform abstraction operations on records or other data items in substantially any format. For example, the technique of FIG. 6 could be applied to a business' internal transaction data in one or more proprietary formats; such data is sometimes referred to herein as "proprietary transaction data". The technique of FIG. 6 could also be used to perform abstraction operations on items that are not data items, e.g. application items, by operating on data items that represent them. As also explained below, the techniques of FIGS. 5 and 6 could be combined in an implementation that handles diverse collections of data items, some of which are in standard formats and some of which are in proprietary formats. If however, each format is a standard or nearly standard format, the technique of FIG. 6 could be used, but the technique of FIG. 5 could also be used independently of the technique of FIG. 6 in the way described above, or could be implemented to include the technique of FIG. 6, as also suggested above. In short, the technique of FIG. 6 is general, useful with substantially any format, whether standard, nearly standard, or proprietary.

Some operations in FIG. 6 are controlled by a human operator, and are therefore only partially automated, but certain operations are performed automatically. In particular, extraction of pre-integration information is performed automatically, thus implementing operations as in box 17 (FIG. 1).

In response to an operator request, the operation in box 350 receives and stores transaction data items. In an implementation as in FIG. 4, the operation in box 350 could, for example, be performed in part on proprietary transaction data 256, which can be received through I/O component 210 and can be stored in data memory 222 or in server 214, similarly to box 300 in FIG. 5. An exemplary implementation that could be used in box 350 to operate on data 256 is described below in relation to FIG. 10. As implied above, however, proprietary transaction data 256 includes a body of transaction data that is not in a standard format such as ANSI ASC-X12, EDIFACT, or emerging XML business standards, but rather is in a business' proprietary format.

In specific implementations, proprietary transaction data 256 could, however, include data about the same set of transactions as standard transaction data 250; in other words, proprietary transaction data 256 can be the internal business data from which standard transaction data 250 was mapped or vice versa. Furthermore, since the technique of FIG. 6 is general, the operation in box 350 could instead receive and store standard transaction data 250; an exemplary implementation that could be used in box 350 to operate on data 250 is described below in relation to FIG. 7. In more complicated implementations, the operation in box 350 might receive and store a body of data in multiple formats, such as a mixture of standard and proprietary formats.

In an implementation with proprietary transaction data 256, the operation in box 350 can also receive and store proprietary analyzer map 258, a component that is typically useful only for recording information about the proprietary data formats of a business. Like map 252, map 258 can be implemented, for example, as a data structure that can be provided to commercially available mapping software in performing operations as described in greater detail below.

After transaction data items have been stored in box 350, operations in box 352 produce attributes that include automatically extracted pre-integration attributes. Automatic extraction in box 352 can, for example, be performed by a routine executed by server 214 or by a processor in processing components 202; for example, the routine can be implemented as in Appendix M, which includes code that calls Sql stored procedures 234, Sql views 238, and reporting tool 240. The exemplary implementation in Appendix M automatically creates tables that contain pre-integration attributes.

Operations implementing automatic extraction in box 352 can, for example, obtain usage attributes as described above in relation to FIG. 5. It is generally straightforward to write Sql code that goes through all fields or elements in the stored data items and groups or summarizes data items at various levels of detail. The results indicate usage attributes or other pre-integration attributes for each type of field or element, such as hard coded, empty, or another concise description, or, if appropriate, a complete list of all values found for the field or element. The resulting automatically extracted pre-integration attributes can be added to standard transaction attributes 254 or proprietary transaction attributes 260, as appropriate.

The techniques of FIGS. 5 and 6 can be combined or used together in various ways. For example, they could be used to obtain both segment group data structures such as seglets and maplets for transaction type data in standard format and also to obtain pre-integration attributes for the transaction type data in standard format and other transaction type data in proprietary format, allowing integration of the two. Also, the two techniques could be performed together in an alternating, interactive manner in response to operator input.

On the other hand, when operating as in FIG. 6 on data items only in proprietary formats, the attributes obtained in box 352 may complete an abstraction operation. Further abstraction is not necessary, because the attributes are sufficient to allow further operations on data items in proprietary format. It is possible at this point to provide, e.g. percentages of white space and of hard coded fields or other useful characteristics of data items in proprietary format.

Figure 7:
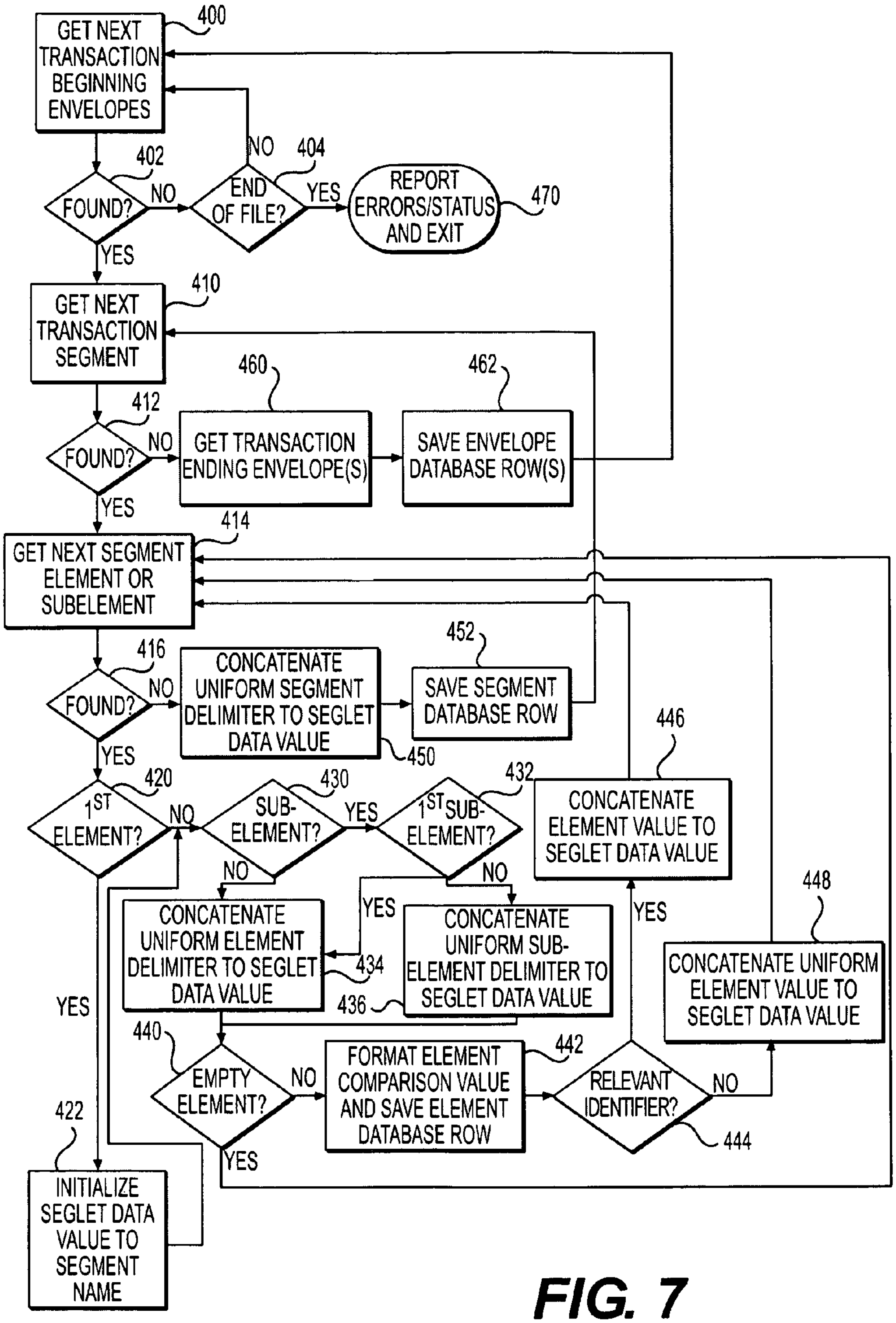
FIG. 7 is a flow chart showing a detailed exemplary implementation of how standard transaction data could be analyzed as in FIG. 5.

FIG. 7 shows in greater detail how the operation in box 302 in FIG. 5 could be implemented. The implementation in FIG. 7 is one of many approaches, but illustrates many of the features described above, including production of seglets and error reports and also handling of subelements. The illustrated implementation begins with standard transaction data 250 stored in data memory 222, and a CPU in processing components 202 can begin accessing data 250 at its first memory location, continuing through memory locations in sequence until an end of file code is reached.

The operation in box 400 begins an outer iterative loop that goes through each transaction in data 250. The operation in box 400 also begins a first inner iterative loop that accesses memory locations until the test in box 402 determines that a retrieved item of data satisfies a criterion for transaction beginning envelopes, which is typically a series of one or more segments positioned immediately before a transaction, not part of the transaction, but with descriptive information such as sender, receiver, standards version, document type, control numbers, and control counts. The operation in box 402 can be implemented in accordance with one or more standards such as ANSI ACS-X12, EDIFACT, or emerging XML business standards, and can also accommodate other recognized standards, such as HL7 or NCPDP. The type of transaction beginning envelope first found in box 402 could indicate to the CPU which standard format is applicable to data 250. If a transaction beginning envelope has not been found, and if the operation in box 404 determines that an end of file code has not been found, another iteration of the inner iterative loop begins in box 400 by retrieving the next item of data in the file.

After a transaction beginning envelope is found, the operation in box 410 begins a second inner iterative loop that gets and, handles transaction segments until the operation in box 412 determines that another transaction segment was not found; a segment typically includes a segment name followed by one or more element delimiter/element value pairs (possibly with the element value empty), terminating with a segment delimiter, and identifiable by its name, position, and loop ID. Inside this second inner iterative loop, the operation in box 414 begins an iterative subloop that gets and handles each element or subelement of a segment until the operation in box 416 determines that another element or subelement was not found.

Within the subloop, the operation in box 420 branches based on whether the element found in box 414 is the first element of the current segment. If so, the operation in box 422 initializes a new seglet data value to the first element's value, which is the segment name, and then continues to box 430.

The operation in box 430 next determines whether the current element is a subelement, such as by testing whether the next delimiter is a subelement delimiter. If so, the operation in box 432 branches based on whether the subelement is the first subelement of the current element. If so, or if the operation in box 430 determined that the current element is not a subelement, then the end of the previous element has been passed, and the operation in box 434 therefore concatenates a uniform element delimiter to the seglet data value. Otherwise, the operation in box 436 concatenates a uniform subelement delimiter to the seglet data value, because the previous subelement has been passed.

The operation in box 440 then branches on whether the current element is an empty element, i.e. an element that has no characters. If not, the operation in box 442 formats an element comparison value for the current element, such as by formatting numeric, date/time, and text fields that will allow comparison in subsequent operations. The operation in box 442 also saves an element database row in the element table for the current subelement or element, because it is not an empty subelement or element and could therefore be matched with a subelement or element in proprietary transaction data 256. The operation in box 444 then branches based on whether the current subelement or element value is a relevant identifier: If it is, the Operation in box 446 concatenates its value to the existing seglet data value; but if it is a non-identifier or an irrelevant identifier, then the operation in box 448 instead concatenates a uniform element value to the existing seglet data value.

An iteration of the iterative subloop is completed by a determination of an empty element in box 440 or by concatenation of a value in box 446 or box 448. Therefore, the next iteration again begins in box 414 by getting the next element or subelement of the segment being handled. If the operation in box 416 determines that another element or subelement was not found in box 414, the iterative subloop is complete and the operation in box 450 concatenates a uniform segment delimiter value to the existing seglet data value. The operation in box 452 then saves the database row for the segment currently being handled in seglet/envelope table.

When a segment's database row has been saved in box 452, an iteration of the second inner iterative loop is complete, and the technique then returns to the operation in box 410 to begin the next iteration by getting the next transaction segment. If the operation in box 412 determines that another transaction segment was not found the second inner iterative loop is complete and the operation in box 460 gets the transaction ending envelope, a set of one or more segments positioned immediately after a preceding transaction's data items, but not themselves part of the preceding transaction's data items. The operation in box 462 then saves the database row or rows for the transaction currently being handled in the seglet/envelope table.

When a transaction's database rows have been saved in box 462, an iteration of the outer iterative loop is complete, and the technique then returns to the operation in box 400 to begin the next iteration by getting the next transaction beginning envelope. If the operation in box 402 determines that another transaction beginning element was not found and the operation in box 404 determine that an end-of-file code was found, the outer iterative loop is complete and the operation in box 470 provides a report of errors and status before exiting.

As suggested above, a successful implementation approximately the same as FIG. 7 has been implemented with an inbound EDI map executable by ECGateway. But this is only one of many ways that the operations in FIG. 7 could be implemented, with or without commercially available mapping software.

Figure 8:
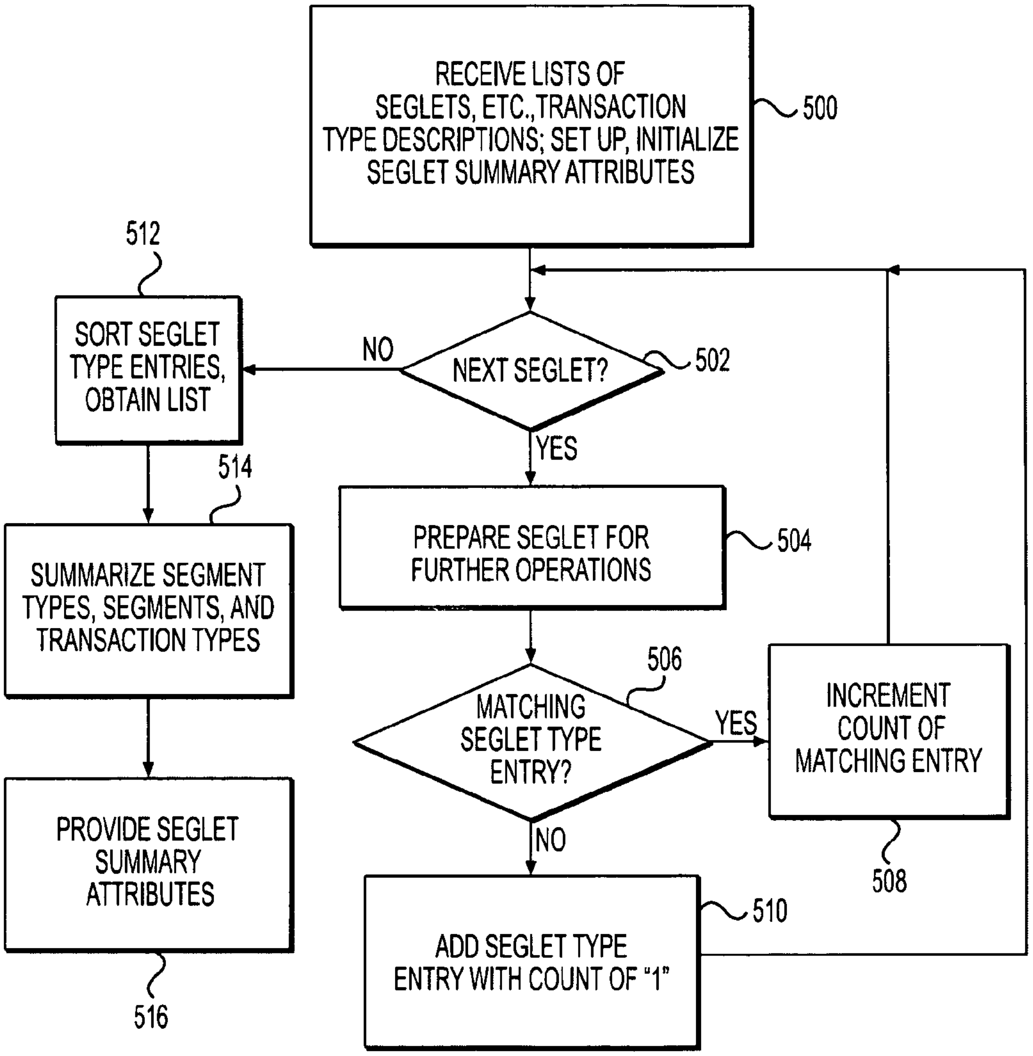
FIG. 8 is a flow chart showing an exemplary implementation of how seglets could be grouped as in FIG. 5.

FIG. 8 shows in greater detail one way to implement the operation in box 310 in FIG. 5. The exemplary implementation in FIG. 8 is appropriate for the exemplary implementation in FIG. 7, but also illustrates general features that could be used in other implementations. Illustrative Sql server source code that has been successfully used to implement an approximation of FIG. 8 is found in Appendix F.

The operation in box 500 begins with components of standard transaction attributes 254, including a list of seglets obtained in the technique of FIG. 7, a list of envelopes and segments obtained in the technique of FIG. 7, and a table with text description of each EDI standard transaction type, which can be obtained from tables supplied with commercially available third party mapping products. The list of seglets can be provided in the form of a seglet table in which each row is a seglet with columns as specified in Appendix B.

The operation in box 500 also sets up and initializes seglet summary attributes 262. In particular, seglet summary attributes 262 includes an initialized list of seglet types based on groupings of identical seglets.

The technique of FIG. 8 includes an iterative loop that goes through the rows of the seglet table. The operation in box 502 begins each iterative loop by getting the next row of the seglet table and determining whether it is a seglet. If it is, the operation in box 504 can optionally be performed to prepare the seglet for further operations if necessary, such as by stripping off trailing uniform element delimiters; these changes could more logically be made as part of the operation in box 302

(FIG. 5), but, for some third party translators, might be easier to implement after box 502, such as with a simple Sql statement. The operation in box 506 then compares the prepared seglet with existing seglet type entries in seglet summary attributes 262. If it finds a matching seglet type entry, the operation in box 508 increments a count in the matching entry that indicates the number of occurrences of that seglet type in standard transaction data 250. If there is no matching entry, the operation in box 510 adds a seglet type entry to attributes 262 for the seglet's type, and initializes the count for the seglet type to "1". In either case, the iterative loop returns to the operation in box 502 to begin the next iteration.

When all the seglets in the list have been handled, the operation in box 512 performs any necessary sorting of the seglet type entries, obtaining a sorted list that can similarly be a table. The columns of the table can include transaction direction, transaction name, transaction version, segment name, segment position, seglet value, seglet count, trading partner ID, and so forth.

When the sorted list of seglet types has been obtained, the operation in box 514 normalizes segment type rows of the list of envelopes and segments and summarizes them into a number of summary tables; summarizes the segment rows used to identify business entities in the transaction, and summarizes the transaction type rows in the table of text description. Finally, the operation in box 516 provides seglet summary attributes 262 with all the items of data from boxes 512 and 514.

Figure 9:
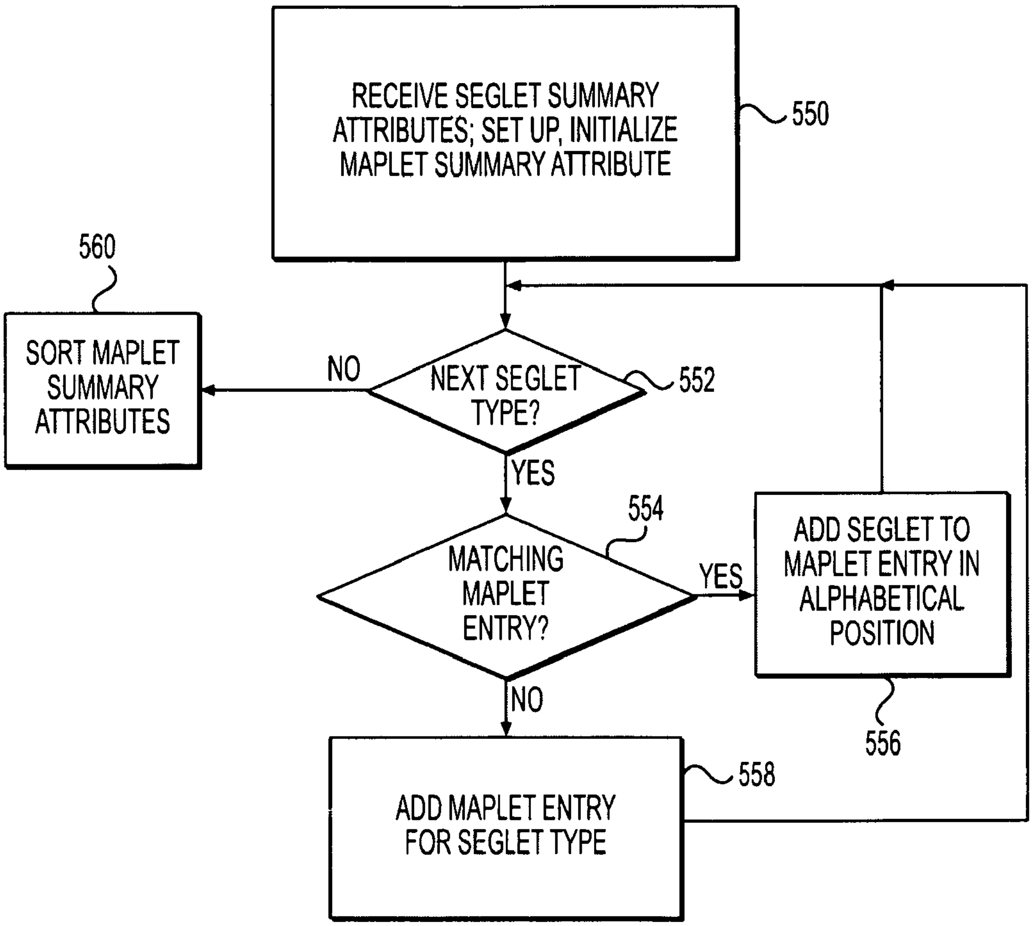
FIG. 9 is a flow chart showing a detailed exemplary implementation of how maplet summary attributes could be produced as in FIG. 5.

FIG. 9 shows in greater detail one way to implement the operation in box 320 in FIG. 5. The exemplary implementation in FIG. 9 is appropriate for the exemplary implementations in FIGS. 7 and 8, but also illustrates general features that could be used in other implementations. Illustrative Sql server source code that has been successfully used to implement an approximation of FIG. 9 is found in Appendix D.

The operation in box 550 begins with seglet summary attributes 262 obtained in box 516 in FIG. 8. The operation in box 550 also sets up and initializes maplet summary attributes 264. In particular, maplet summary attributes 264 includes an initialized list of maplet entries based on groupings of seglet types that meet a match criterion as described below.

The technique of FIG. 9 includes an iterative loop that goes through the sorted list of seglet types, handling each seglet type's entry in the list as shown. The operation in box 552 begins each iterative loop by getting the next entry and determining whether it is a seglet type entry. If it is, the operation in box 554 then compares the seglet type entry with existing maplet entries in maplet summary attributes 264, applying a match criterion. The match criterion could require, for example, that the seglet type entry have the same segment name, transaction direction, and trading partner as the maplet entry.

If the operation in box 554 finds a matching maplet entry, the operation in box 556 adds the seglet type's string of element values and delimiters to the maplet entry, in a position according to an alphabetical sort of seglet type strings; the operation in box 556 can also increment a count in the maplet entry. But if there is not already a matching maplet entry, the operation in box 558 adds a maplet entry to attributes 264 for the fields of the match criterion, with the maplet entry including only the current seglet type's string of element values and delimiters; the operation in box 558 can also initialize the count in the maplet entry to "1". In either case, the iterative loop returns to the operation in box 552 to begin the next iteration.

When all the seglet types in the list have been handled, the operation in box 560 performs any necessary sorting of the maplet entries, obtaining a sorted list that can similarly be a table. The columns of the table can include transaction direction, transaction name, transaction version, maplet name, maplet value, maplet count, trading partner ID, and so forth. The operation in box 560 could be extended to sort by loop ID and position.

Figure 10:
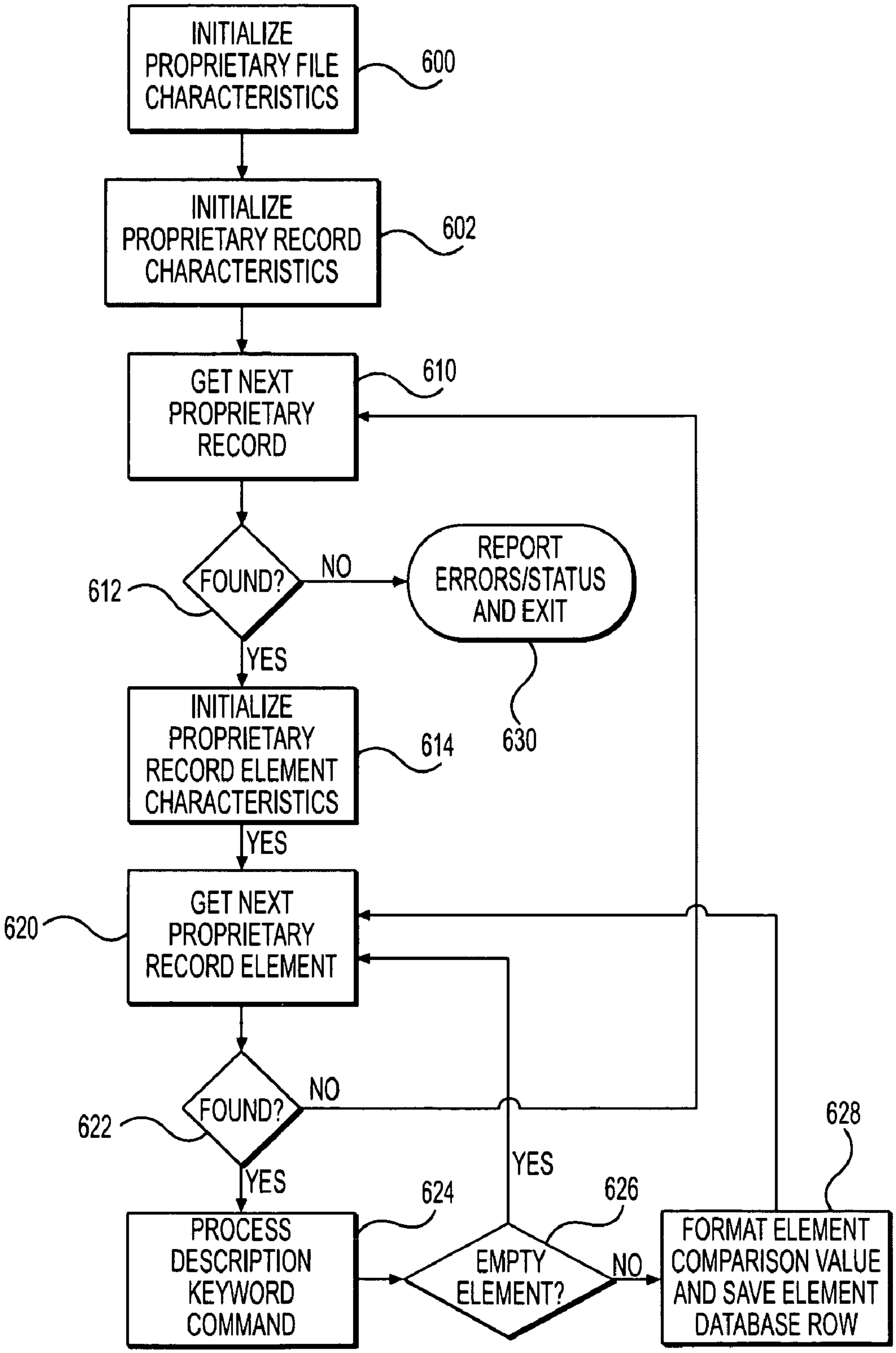
FIG. 10 is a flow chart showing an exemplary implementation of how proprietary transaction data could be analyzed as in FIG. 6.

FIG. 10 shows in greater detail one way to implement certain operations in box 350 in FIG. 6. The exemplary implementation in FIG. 10 is appropriate for the exemplary implementation in FIGS. 7 and 8, but also illustrates general features that could be used in other implementations.

The operations in FIG. 10 can be implemented with proprietary analyzer map 258, a map that can be executed by a third party mapping and translation tool, and performs any-to-any mapping based on internal file descriptors in proprietary transaction data 256, recording detailed information about the content of data 256 in a table. Appendix G is an illustrative list of tables that could be populated with information concerning all proprietary transactions using the third party tool, and the information in the tables can be entered manually or through automated import mechanisms supported by some commercially available third party tools. The table descriptions in Appendix G are, however, not all-inclusive, but are rather only illustrative of structures implemented in a typical, currently available third party tool.

The operation in box 600 begins with information as in Appendix G, with additional parameters, and with proprietary transaction data 256. Data 256 could, for example, be flat, delimited, keyed, XML, HTML, database or other formatted transaction data. The additional parameters could include, for example, direction, transaction ID code, mapper file name, and actual file name. In response, the operation in box 600 initializes proprietary file characteristics based on information as in Appendix G. Then, the operation in box 602 initializes proprietary record characteristics, also based on information as in Appendix G.

The operation in box 610 begins an outer iterative loop that gets each proprietary record in data 256 in accordance with the file characteristics from box 600. If the operation in box 612 determines that a data item from box 610 is a proprietary record in accordance with the proprietary record characteristics from box 602, an iteration of the outer loop continues with the operation in box 614, and can initialize proprietary record element characteristics. Initial file characteristics can be accessed based on manual input MapperFileName that correlates with the FileName field of the FileHeader table FileRecords and RecordHeader tables can be similarly accessed. If a file has multiple record types, the record type field can be assumed to be in the same location for each record, as is typical and customary. The RecordFields table can be accessed to determine the location of a record type field. As each record is read, the record type field can be used to read the appropriate RecordFields item to process each field. Special commands are contained in the Description field of the RecordFields table.

The operation in box 620 begins an inner iterative loop that gets and handles each element in the current record. If the operation in box 622 determines that a data item from box 620 is a proprietary record element in accordance with the proprietary element characteristics from box 614, an iteration of the inner loop continues with the operation in box 624, processing a description keyWord command from the Description field of the RecordFields table. Then, the operation in box 626 branches based on whether the operation in box 624 produced an empty element, i.e. an element without a value. If not, the operation in box 628 formats an element comparison value to include appropriate items to allow comparison of the element with attributes 254 obtained from standard transaction data 250. The operation in box 628 then sages the element database row in a list of elements, such as in a table with columns as shown in Appendix H. In either case, the inner loop then returns to box 620 to begin its next iteration.

When the operation in box 622 does not find a proprietary record element, the inner iterative loop is completed, and the current record's element database rows are also complete. Therefore, the technique returns to box 610 to begin the next outer iterative loop, for the next proprietary record.

When the operation in box 612 does not find a proprietary record, the operation in box 630 is performed, providing an errors/status report and exiting. In addition, after the operation in box 630, the list of elements in accordance with Appendix H is complete and available for further operations.

Figure 11:
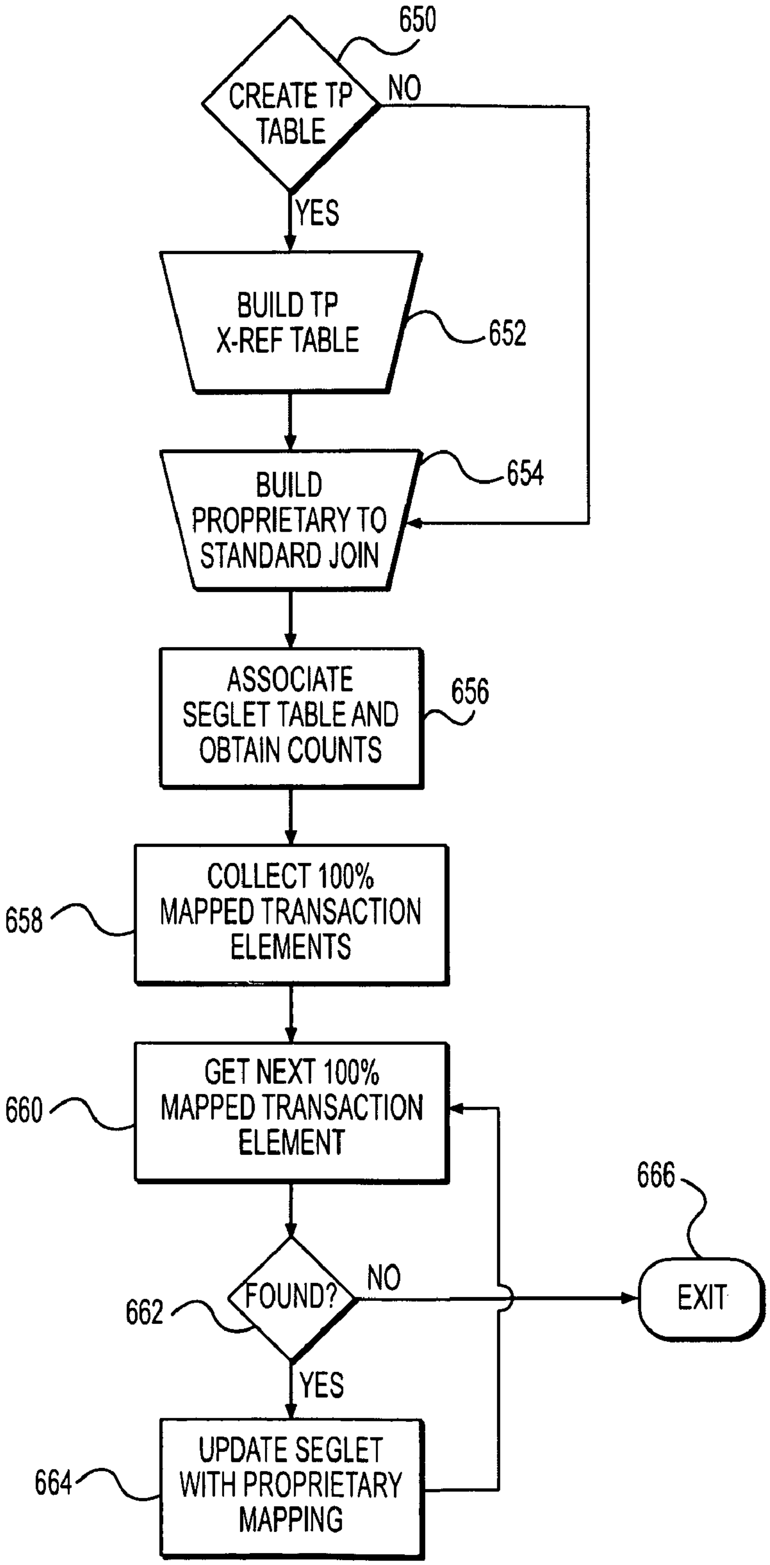
FIG. 11 is a flow chart showing a detailed exemplary implementation of how standard and proprietary fields could be matched and matching fields used to modify standard transaction attributes after analysis as in FIG. 6.

FIG. 11 shows in greater detail one way to use a list of elements produced as in FIG. 10 in combination with a list of elements produced as in FIG. 7. The technique in FIG. 11 is an example of a special type of integration that produces merged attributes, such as where standard transaction data 250 relate to proprietary transaction data 256. Other implementations are envisioned to relate different transactions in transaction data 250 to each other and similarly to relate different transactions in transaction data 256 to each other. The exemplary implementation in FIG. 11 is appropriate for the exemplary implementation in FIG. 10, but also illustrates general features that could be used in other implementations. Illustrative Sql server source code that has been successfully used to implement an approximation of FIG. 11 is found in Appendices E and J-L.

The operation in box 650 begins with a list of elements as from FIGS. 7 and 10, in accordance respectively with Appendices A and H. The operation in box 650 determines whether it is necessary to create a trading partner (TP) table. This operation may be implemented with an operator decision based on an inspection of the data in the lists. For example, the operator may decide that a TP table is necessary if the two lists cannot be cross-referenced or "joined" without joining on trading partner envelope identifiers. If necessary as determined in box 650, the operation in box 652 builds a TP X-ref table based on proprietary transaction data 256, containing TP envelope values.

In either case, the operation in box 654 can then continue the operation in box 354 in FIG. 6 by building a list of matching elements resulting from joining the two lists, referred to in FIG. 11 a "proprietary to standard join"; Sql code in Appendix E illustrates an example template for linking a Standard Element Table with a Proprietary Element Table. This operation can be a join on formatted values, but these values alone are typically not sufficient. FirstSegment-Element# fields can be used to zero in the join operation to a specific document, typically involving a document number and a document date. It may also be necessary to join on trading partner envelope identifiers from the TP X-ref table from box 652. The resulting proprietary to standard join will show a many-to-many relationship, but only certain matches will occur in every transaction, and such a match is referred to in FIG. 11 as a "100% mapped transaction element".

To find and count 100% mapped transaction elements, the operation in box 656 can perform a join operation on the seglet/envelope table from box 302, per Appendix B, with the element table per Appendix A on transaction, envelope sender/receiver, envelope control numbers, segment name, and segment position. Then, the rows can be grouped by transaction, trading partner, seglet, element, and subelement, and a count of the element value can be returned. The result can then be joined with the proprietary to transaction join results grouped by transaction, trading partner, seglet, element, subelement, record name, and element name to return a count of the element value. If the two counts are equal, a 100% matched transaction element has been found. Sql code in Appendix J illustrates an implementation of the operation in box 656.

The operation in box 658 can collect the 100% matched transaction elements found in box 656. Sql code in Appendix K illustrates an implementation of the operation in box 658.

The operation in box 660 begins an iterative loop that gets the next 100% matched transaction element from box 658. If the operation in box 662 determines that an 100% matched transaction element was found in box 660, an iteration of the loop continues with the operation in box 664, updating the affected seglet, such as in a list of seglets from box 302 in FIG. 5, with the corresponding proprietary mapping indicated by the proprietary to standard join from box 654. This operation can be performed based on the affected element or subelement position in the seglet, where a uniform delimiter, such as a universal proprietary element delimiter, can be appended followed by a 2-tuple including a proprietary record name and a proprietary field name. As a result, the seglet will be distinguishable from other seglets that are otherwise the same but are mapped differently in proprietary transaction data 256. Illustrative Sql source code that has been successfully used to implement an approximation of box 664 is found in Appendix L.

When the operation in box 662 determines that another 100% mapped transaction element was not found in box 660, the iterative loop is completed, and the operation in box 666 exits, leaving the list of seglets updated based on proprietary transaction data 256.

Other operations in FIGS. 5 and 6, such as in boxes 300, 304, 306, 312, 314, 316, 322, 324, and 326 in FIG. 5 and box 350 in FIG. 6 can also be implemented in any of a wide variety of ways, some of which are suggested above. In general, however, these operations could be implemented with currently available techniques known to those skilled with EDI and Sql software. It is foreseeable that further technology for implementing these and other operations will be developed in the future, all within the scope of the invention.

The exemplary implementations described above in relation to FIGS. 4-11 are merely illustratively of a few of many techniques to produce segment group data structures and attribute data items, e.g. seglet summary attributes 262 and maplet summary attributes 264, or to perform other types of abstraction and integration operations. Many other such techniques could be developed, some of which are mentioned above.

Attribute data items produced as in FIGS. 4-11 could, in turn, be used in a wide variety of applications. FIGS. 12-15 illustrate applications of segment group data structures and attribute data items by reference to maplets as described above.

Figure 12:
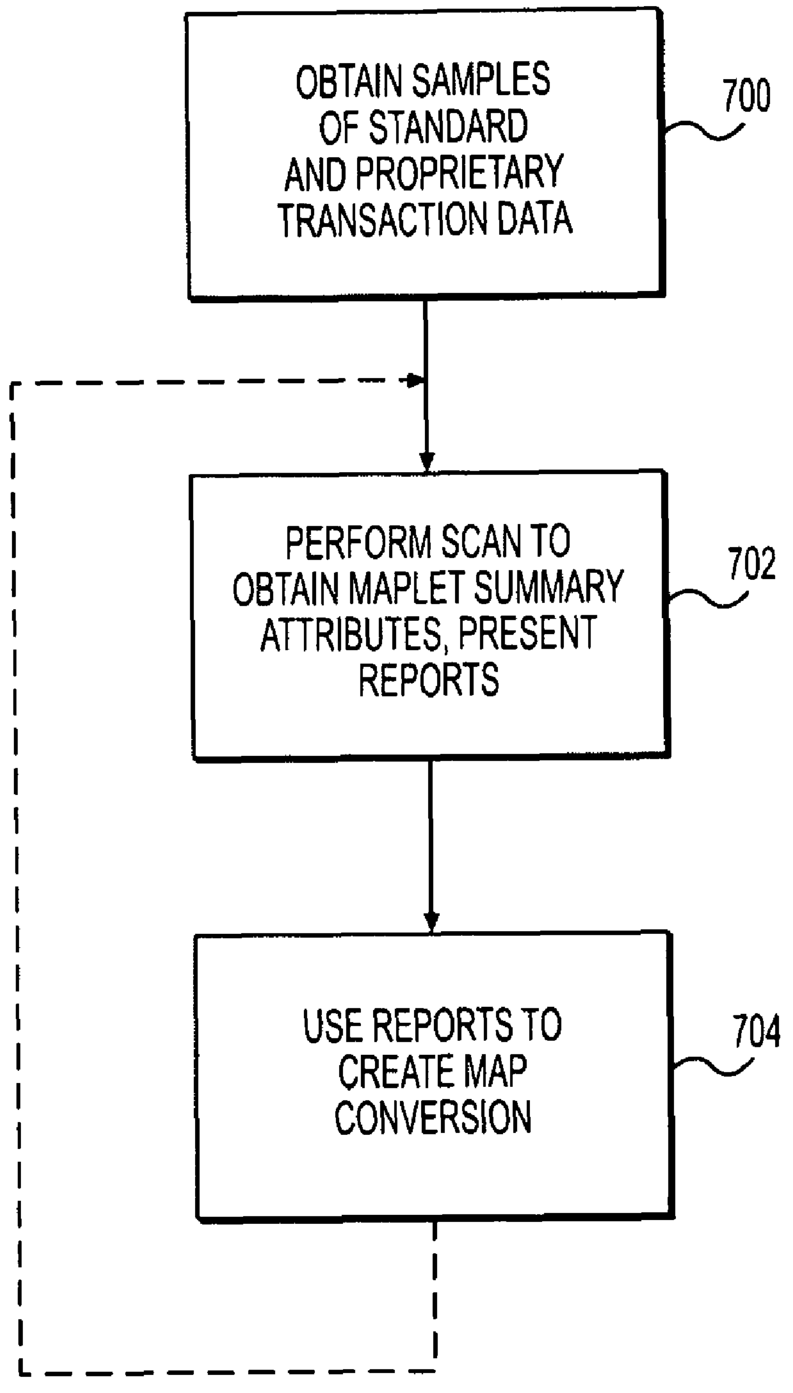
FIG. 12 is a flow chart showing general operations in an exemplary implementation of map conversion with techniques as in FIGS. 5 and 6.
Figure 14:
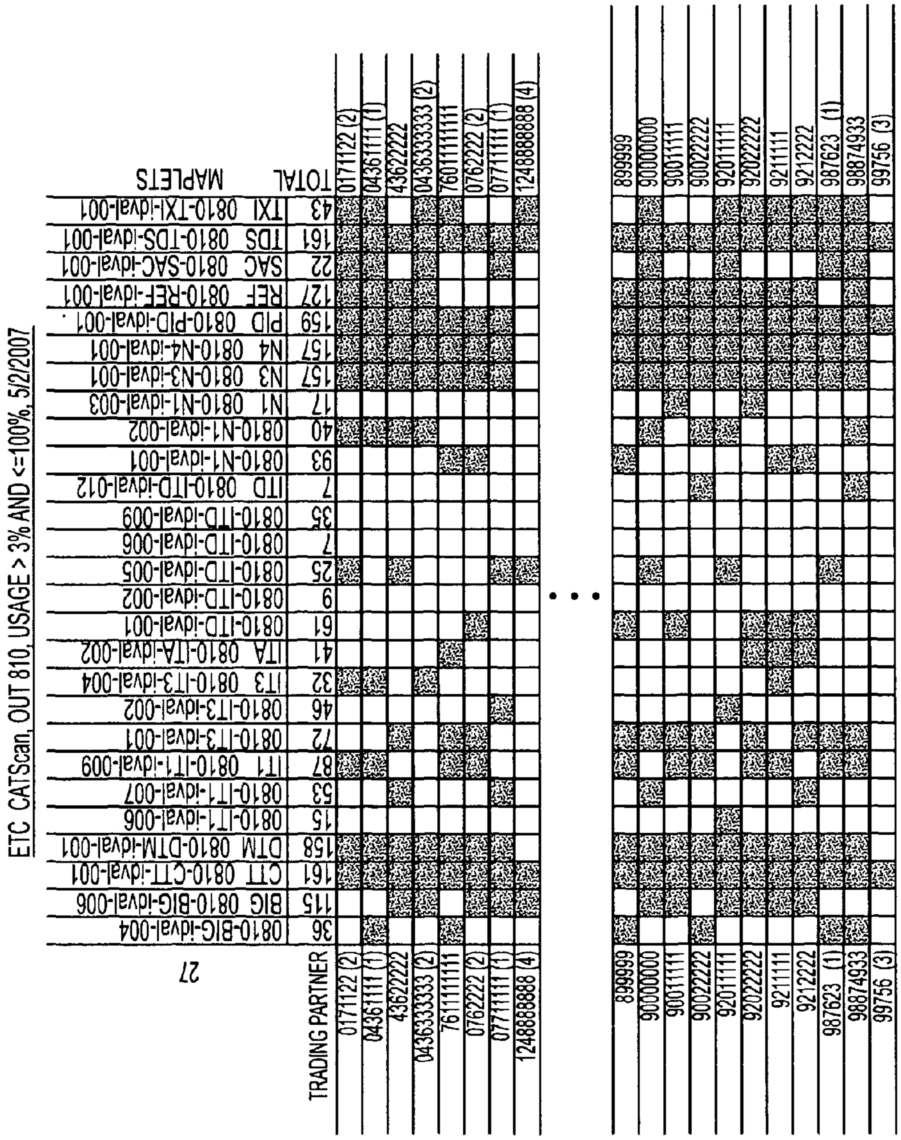
FIG. 14 is an excerpt of a trading partner/maplet cross-tab report that could be presented in an implementation of a technique as in FIG. 12.

The application in FIGS. 12-14 is an example of how attribute data items, such as with segment group data structures, can be used in map conversion, i.e., in an operation in which a business makes a transition from using one type of inbound and outbound mapping to another, such as when changing from one third party translator to another. Traditionally, map conversion is performed by manually analyzing and converting maps from one form to another, a costly and time consuming process. The techniques in FIGS. 12-14 partially automate map conversion and eliminate old or obsolete logic. Initial results indicate that map conversion that would ordinarily require many months when performed manually might only take a small fraction of that time when partially automated with maplet techniques.

The operation in box 700 begins by obtaining counterpart samples of standard transaction data and proprietary transaction data for a set of transactions of a business.

The samples of transactions should be large enough to include a reasonable number of all transactions and trading partners, but care should be taken to not include transactions of types no longer made or standards that are no longer used.

The operation in box 702 then performs a "scan" of the data from box 700, such as with the techniques in FIGS. 5-11 above, producing maplet summary attributes as described above and using them to present reports. FIGS. 13 and 14 illustrate examples of the many types of reports that could be presented in box 702. FIG. 13 shows an excerpt from a segment/trading partner cross-tab report that could be produced based on seglet summary attributes from box 310 in FIG. 5, while FIG. 14 shows an excerpt from a trading partner/maplet cross-tab chart that could be produced based on maplet summary attributes from box 320 in FIG. 5.

The report excerpted in FIG. 13 could be used, for example, to decide whether a list of seglets is satisfactory in box 314 in FIG. 5. The illustrated excerpt includes seglets with the names "BIG", "N3", and "N4". For each seglet, the "Total" column indicates the number of occurrences in standard transaction data 250, and the other columns indicate occurrences with specific trading partners. As suggested by the ellipses at the right and below, the full cross-tab report would include many more seglets and many more trading partners. Of particular interest, however, is that certain rare seglets are apparently errors, and could be changed to be the same as other seglets, thus reducing the number of seglets. For example, the seglet "N3|" occurs only once with trading partner "04361111(1)", and changing it to "N3|val|val" would probably make it correct while also reducing the number of seglets by one.

The report excerpted in FIG. 14 was prepared for common maplets, i.e. maplets that meet a criterion on the frequency with which they are used, illustratively in at least 3% of transactions, and can be seen as a coarse approximation of a map. A similar report could be prepared for rare maplets that are used in less than some maximum percentage of transactions. In each case, the report could also include an entry for each maplet, including an identifier, its percentage of usage, and its value. An example might be:

"0810-BIG-idval-004 22.40 BIG|val|val|val|val|||CR~BIG|val|val|val|val|||DI"

The illustrated maplet named 0810-BIG-idval-004 thus occurs in 22.40% of transactions, and has two seglet types, separated in the maplet's value by the universal segment delimiter "~".

Various other reports could be presented based on maplet summary attributes. For example, an overall maplet summary could be presented that indicates how many maplets are unique from the total number necessary to represent an existing system of maps. Similarly, to obtain further useful information, reports could be presented that list the unique maps by segment, by segment trading partner version, and so forth. Also, summaries could be presented, such as summarizing an EDI to application field map or an application to EDI field map, in each case showing both mapped and unmapped items, e.g. between element/seglets and file/record/fields or vice versa.

From a report as in FIG. 14, a sophisticated operator can quickly provide the additional items necessary to complete a map conversion, as shown by the manual operation in box 704. For example, the operator can provide maps for the black cells of the report, each of which indicates a maplet used and/or required by a given trading partner. Completing every maplet would result in a "super map" that could then be used as a basis to modify, e.g. by a "cut and paste" approach, each maplet associated with a black cell. On the other hand, it may prove adequate to produce a partial map that supports all the maplets found in the transaction data. As suggested by the dashed line from box 704 to box 702, the operator might find it useful to test a map conversion by again performing a scan in box 702.

A technique like that in FIG. 12 has been successfully implemented using operations as in FIG. 5, without the technique in FIG. 6. A case study was performed on a single outbound business document exchanged between 161 trading partners. The existing EDI/B2B system included 159 maps, and this would represent a unique mapping effort of over 98% using traditional map conversion approaches. Based on a sample of documents covering a period of two months and representing over 10,000 real transactions, the experiment found that the 159 maps could be represented by a total of 2015 maplets. Of the 2015 maplets, only 77 were unique, so that the actual unique mapping could be reduced from 98% to less than 1%. In addition, the 77 unique maplets represent a system based solely on real business transactions. And the experiment was completed in a matter of hours rather than weeks or months as would be required for a manual map conversion analysis.

Figure 15:
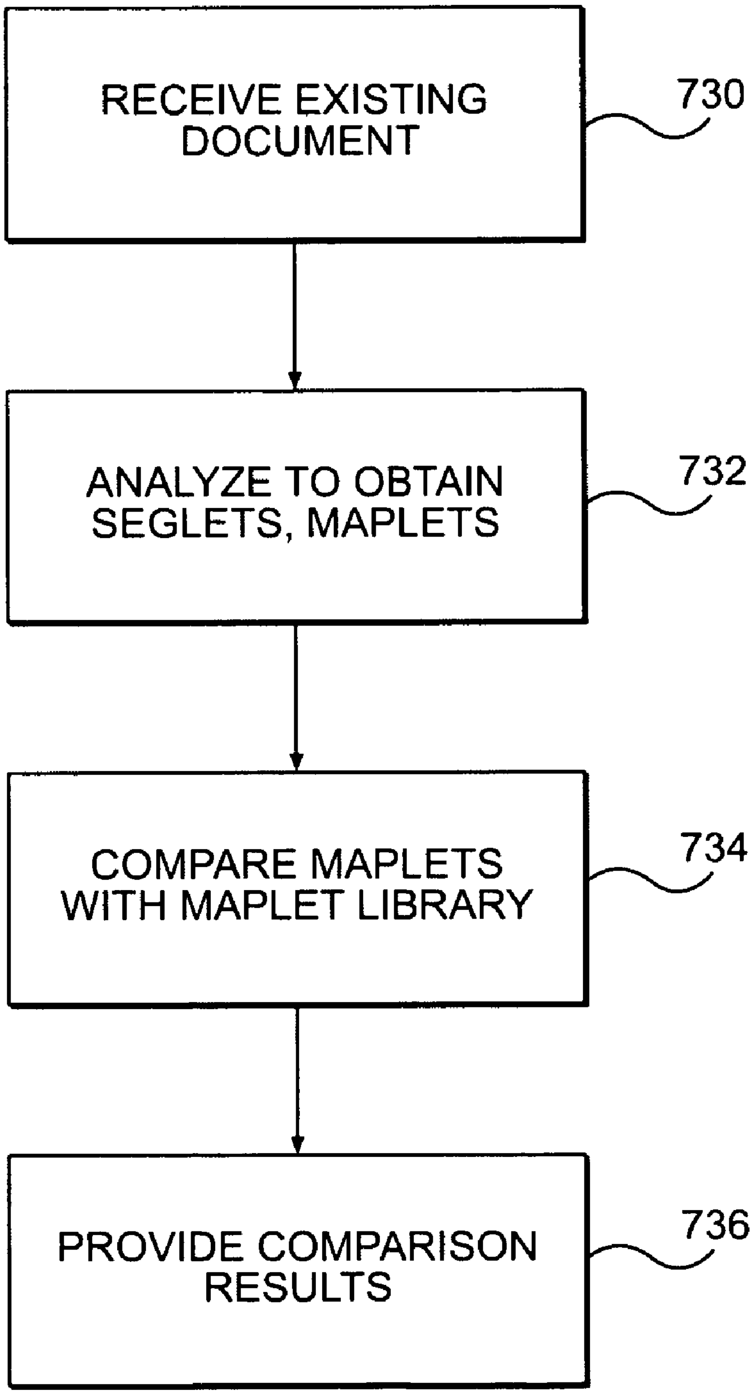
FIG. 15 is a flow chart showing general operations in another exemplary implementation of techniques as in FIGS. 5 and 6, such as in translation.

The application in FIG. 15 illustrates another possible application of attribute data items that include segment group data structures, such as in a translation application. This application depends on the existence of a maplet library that could, like the maplets described above, be developed by analyzing data about real business transactions. The technique of FIG. 15 makes it possible to discover issues affecting a document being translated.

The operation in box 730 begins by receiving an existing document, such as a purchase order or invoice. The existing document can include, for example, an EDI envelope and also transaction data.

The operation in box 732 then analyzes the existing document to obtain seglets and maplets, following operations similar to those in FIG. 5. The operation in box 734 then compares maplets from box 732 with maplets from a maplet library as described above. The operation in box 736 then provides the comparison results in a suitable form for the application; for example, a report could be presented so that an operator could review the comparison results to find problems and/or new development requirements in the existing document.

Figure 16:
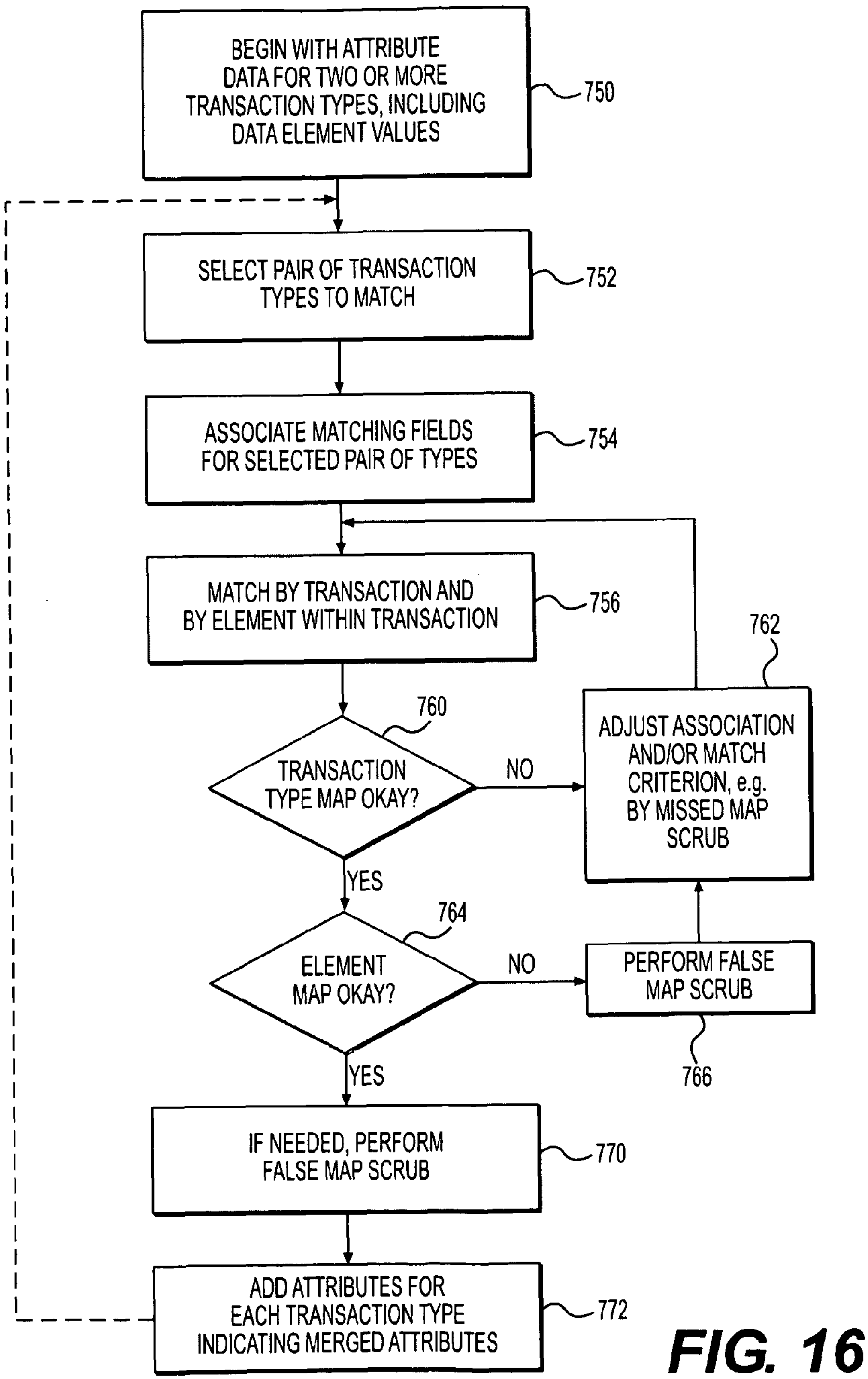
FIG. 16 is a flow chart showing general operations in an exemplary implementation of an integration operation performed on attribute data for transaction types as in FIG. 1.

The application in FIG. 16 illustrates another possible application of attribute data items that include segment group data structures, such as in an integration application. This application can operate iteratively, with each iteration operating on two different formats referred to below as first and second formats; in general, each of the two formats could be any standard, nearly standard, or proprietary format. The application in FIG. 16 could be characterized as determining what attributes of one transaction type also apply to another transaction type; the results are provided in the form of merged attribute data.

The technique of FIG. 16 makes it possible to obtain merged attribute data (analogous to "crosswalk") for actual transaction data items in the two formats, such as for a single transaction. The merged attribute data could be characterized as "mapping attributes" because they indicate information about how a specific field of a record is mapped: For example, a mapping attribute could specify a data type in another transaction type to or from which the field maps or could specify an envelope value useful in mapping; mapping attributes could indicate, for example, whether a given field is always mapped to a specified data type or only partially mapped to a specified data type.

More specifically, FIG. 16 illustrates a technique that can operate a system similar to that in FIG. 4 to perform integration operations on records or other data items in the first and second formats. Mapping could in principle be performed from either of the first and second formats to the other.

In general, operations in FIG. 16 are controlled by a human operator, and are therefore only partially automated. For example, in response to an operator request, the operation in box 750 can begin with transaction type attribute data for two or more transaction types, where the attribute data includes data element values. The attribute data could be produced as described above in relation to FIGS. 1, 5, and 6, could be merged attribute data from the operations in FIG. 16, or could be received from another source.

With the attribute data available, the operator can continue to box 752, in which the operator selects a pair of transaction types to be matched, one type in a first format and the other type in a second format. This operation can be performed manually, such as by interactively selecting the types through a system's user interface. As used herein, to "match" and "matching" refer to operations on two or more items or collections of items that obtain information about which pairs or groups of items satisfy a match criterion across the collections. The term "match results" refers to information obtained by matching, such as information indicating which pairs satisfy a match criterion and/or which pairs do not satisfy the match criterion; the match results can, for example, include mapping attributes as described above.

The operation in box 754 then associates matching fields for the pair of types selected in box 752. This operation is specific to the selected pair, and can be performed manually. The association of fields in box 754 can take the form of a list, table, or other data structure or item of data that pairs or links matching fields. The association serves, in effect, as part of a match criterion, specifying which pairs of fields must match in order for the match criterion to be met; the match criterion could, in addition to the association, specify a standard for determining whether each associated pair of fields matches.

In an implementation as in FIG. 4, the operation in box 754 could use standard transaction attributes 254 and proprietary transaction attributes 260 to obtain an additional part of proprietary transaction attributes 260. This additional part can be implemented as a data structure or other item of data that associates matching fields in standard transaction data 250 and in proprietary transaction data 256.

In such an implementation, the operation in box 754 could be implemented in a variety of ways. In one successful implementation, each pair of counterpart documents are found, such as by comparing fields that include a shared document-unique value such as a purchase order number, invoice number, etc.; all the pairs of counterpart documents can, for example, be linked in a table-like data structure in which each entry includes locations of two counterpart documents. Then, for each pair of counterpart documents in the table, all elements in one document are compared in a pairwise manner with all elements for the counterpart document, to identify all possible matching fields; pairs of matching fields can, for example, be linked in another table-like data structure. Then, each pair of matching fields in any of the pairs of counterpart documents can be compared with all the other pairs of counterpart documents to determine whether it meets a suitable matching fields criterion, such as that the same pair of fields match in every pair—if the matching fields criterion is met, the pair of matching fields can be added to a list in attributes 260 that includes all pairs of matching fields that meet a matching fields criterion. A template view is illustrated by the code in Appendix E.

The operation in box 754 could be performed in various other ways. For example, an association obtained as described above could be adjusted as appropriate if the operation in box 302 lists only the elements in the first segment of each document, because that segment almost always includes one or more identifiers of the document; or an operator could manually modify a template to find matches, such as where there is a purchase order number on each side in a specified field.

When pairs of matching fields have been associated in box 754, the operation in box 756 begins an iterative process, performing matching by transaction and, where two transactions satisfy a match criterion, performing matching by element within the matching transactions; the matching by transaction and the matching by element each produce respective match results. Before matching by element, the operation in box 756 can reformat them according to their data types; for example, data type elements and numeric type elements can be reformatted to consistent format to facilitate comparison. For a strict match criterion, two elements match only if they are equal, and the operation in box 756 records them as matching elements. After all matching elements are recorded, the operation in box 756 also obtains mapping attributes for each data type in each transaction type in the selected pair, such as "always mapped transaction scope (mapped to data type)", "always mapped trading partner scope (mapped to data type)", and so forth. The operation in box 756 can also be implemented with tolerances to identify certain mapping attributes; for example, transaction sample sets may not be perfect, and a tolerance can treat a data element as "always mapped" if it is mapped an appropriate percentage of instances, such as 90%, 92%, or 95%.

The operation in box 760 then branches based on whether the transaction type map from box 756 is satisfactory, e.g. with all transactions matching between all trading partners or other business entities. If not, the operation in box 762 uses the unsuccessful match results and possibly other information to adjust the association from box 754 and/or to otherwise adjust the match criterion, such as by changing a standard for determining whether a pair of transactions matches. For example, the operation in box 762 can include a "missed map scrub", as shown, to resolve situations in which items did not match even though they should have; e.g., for truncation, if an element in the first format allows for 50 characters and the corresponding element in the second format allows only 25, elements in the first format can be truncated to 25 characters to correctly determine whether they match; also, for translation, if an element in the first format must be translated to a different value to match the corresponding element in the second format, the missed map scrub can add a translation table to the match criterion to correctly determine whether elements match. The operation in box 762 can be performed manually, with an operator reviewing the results and using them to decide what adjustments are needed. Then, the technique begins another iteration, again performing matching in box 756.

If the transaction type map is satisfactory in box 760, the operation in box 762 then branches based on whether the element map from box 756 is satisfactory, e.g. with all elements matching between all matching transactions. If not, the operation in box 766 can perform a "false map scrub"; this operation can be performed manually, and involves reviewing the match results to find matches or mappings between the first and second formats that are not appropriate in view of data in the fields—the false map scrub can also include producing various false map tables used to filter out false matches. Then, the operation in box 762 again uses the unsuccessful match results and possibly other information to adjust the association from box 754 and/or to otherwise adjust the match criterion, such as by changing a standard for determining whether an associated pair of fields matches. This can be performed manually, as described above. Then, the technique begins another iteration, again performing matching in box 756.

When a complete match is achieved, the operation in box 770 can perform a false map scrub if necessary. Ordinarily, however, only one false map scrub is likely to be needed, so that this operation may not be necessary if the operation in box 766 has previously been performed.

Finally, the operation in box 772 can add mapping attributes from the match results (possibly after false map scrub in box 770) to each transaction type's attribute data from box 750, thus obtaining merged attribute data indicating merged attributes. Because they coincide with a complete match, the merged attribute data from box 772 allow merging of the selected pair of transaction types in the first and second formats.

In an implementation as in FIG. 4 as described above, operating on data items in a standard format and a proprietary format and also using techniques as in FIG. 5, the operation in box 772 can use the matching fields that resulted in a complete match to modify standard transaction attributes 254. In this operation, a seglet that includes one of the matching fields on the standard side can be modified to instead include the location of the matching field on the proprietary side. At a result, when seglets are grouped, as in box 310 in FIG. 5, seglets that would otherwise have been identical are different due to proprietary information and are therefore grouped differently based on business-specific proprietary information, bringing out differences in mapping logic. In a simple example, if a field is mapped to a header location in documents for transactions with a first trading partner but to a different value in documents for transactions with a second trading partner, the header location could be inserted into the field in seglets for the first trading partner to distinguish them from seglets for the second trading partner; the header location could, for example, replace a uniform element value inserted by the operation in box 302; these operations can be performed by calling procedures within Sql stored procedures 234 and Sql user functions 236, which in turn reference data in Sql views 238.

As suggested by the dashed arrow from box 772 to box 752, the operator can then select another pair of transaction types in box 752, such as transaction types in the same first and second formats. Then, similar operations can be performed for that pair, and so forth, until the operator is satisfied that the merged attributes are sufficient to perform mapping between the first and second formats and to merge collections of data items in the two formats.

It is believed that attribute data items that include segment group data structures may find a variety of other applications, including in executive reporting, competitive takeovers, smart translation, maplet banks, and so forth. It is further believed that merged attribute data items that include mapping attributes from results of matching may find a variety of other applications, including business integration and general integration, such as with enterprise software. In some applications, significant time saving will be realized over traditional techniques, while in others it May be possible to obtain information that was previously unavailable.

Exemplary implementations described above are illustrated with specific standards, types of transactions, and other characteristics, but the scope of the invention includes various other standards, types of transactions, and characteristics. Furthermore, the various data items, data structures, and hardware components described above are merely exemplary, and various others could be used in implementing the techniques described above. For example, maplets as described above are encoded in text strings that are similar to standard formats and visually easy to understand and manipulate, but various other encoding methods could be used, such as in database objects, in XML-based objects, in object-oriented classes, and so forth. Furthermore, values such as delimiter values are illustrated above as separate items of data, but could be included in various encodings or other ways or could be omitted entirely if their positions can be inferred from other features of data items. Also, some exemplary implementations described above involve transaction data that is generally compliant with a standard format or with a proprietary format, but techniques could be implemented with transaction data that is at least partially non-compliant, or that includes parts that are compliant with different standard or proprietary formats. Further, exemplary implementations involve integration of two items, pairwise matching of fields, and so forth, but such techniques could be extended to integrate three or more items, to perform matching on three or more fields, and so forth.

Exemplary implementations employ specific abstraction operations and cause specific types of artifacts, but a wide variety of other such operations could be used within the scope of the invention. The invention is not limited to the specific examples of standard-based abstraction artifacts and pre-integration information, but various other artifacts could be caused by abstraction operations.

Similarly, exemplary implementations obtain segment group data structures in specific ways, automatically extract pre-integration information in specific ways, and obtain attribute data items and merged attribute data in specific ways, but a variety of other such operations could be used within the scope of the invention. The invention is not limited to the specific examples, e.g., of obtaining segment group data structure, or automatically extracting pre-integration information, and of obtaining attribute data items and merged attribute data.

Exemplary implementations also provide output data in specific forms, resembling standard formats, but output data could be provided in a wide variety of other ways. For example, output data could be provided that does not resemble any standard format, such as in the form of a spread sheet table or a database object. The output data might provide statistical or other general information instead of or in addition to the information described above.

Exemplary implementations employ code in the attached appendices. Code in the appendices is illustrative of many features described herein, and was part of prototype implementation that has successfully operated to perform abstraction to obtain segment group data structures and attribute data. It is not, however, optimized. It would be straightforward to use the disclosure herein to develop improved implementations. For example, current candidate designs would add XML to standard-based abstraction operations; would provide more robust analysis of proprietary transaction data and integration attributes; and would provide more robust transaction matching capabilities to include standard transaction to standard transaction matching, proprietary to proprietary matching, translation table element matching, standard based envelope to data element matching, and so forth.

While the invention has been described in conjunction with specific exemplary implementations, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. An article of manufacture comprising:

a data storage component;

a processor connected to access data stored by the data storage component; and stored by the data storage component:

one or more segment group data structures, each including information about one or more types of transaction segment data items; and one or more attribute data items that indicate attributes of types of transactions;

the segment group data structures and the attribute data items including standard-based abstraction artifacts resulting from a standard-based abstraction operation that uses a starting transaction segment data item in a standard-based format to obtain a respective resulting data item; the starting transaction segment data item including one or more element fields, each element field having a respective element value that is one of a set of possible element values of a respective transaction-related attribute;

the standard-based abstraction artifacts including a replacement artifact indicating that, in each of a first subset of one or more of the element fields, the respective element values in the starting transaction segment data item were replaced in the resulting data item by a universal element value that represents any type of element value;

the standard-based abstraction further including added information indicating one or both of:

a usage attribute that could not be obtained by inspection of the starting transaction segment data items individually, the usage attribute indicating one or more of: whether a field is always, sometimes, or never used in data items of the same type; whether a field always has the same value in data items of the same type; transaction scope; trading partner scope; whether a field or element is hard coded; whether a field or element is empty; and a complete list of all values found for a field or element; and a type attribute indicating at least one of a type of transaction, a segment name, a trading partner, a type of loop, a position, sender, receiver, standards version, document type, document number, document date, control numbers, and control counts.

2. The article of claim 1 in which each segment group data structure includes one or more segment type data items, each segment type data item including information about a respective type of starting transaction segment data item;

one of the segment type data items including one or more of the standard-based abstraction artifacts that are replacement artifacts.

3. The article of claim 2 in which each segment type data item includes a sequence of element fields and delimiters.

4. The article of claim 2 in which at least one starting transaction segment data item includes one or more delimiters; each delimiter having one of a set of delimiter values; a second one of the replacement artifacts indicating that, for one of the delimiters, its delimiter value was replaced by one of a set of one or more uniform delimiter values.

5. The article of claim 4 in which, in a second subset that includes one or more of the element fields, the respective element values were not replaced in the one of the segment type data items; the one of the segment type data items including information about a type of starting transaction segment data items with respective resulting data items that all have the same element value in one or more element fields in the second subset and that meet a similarity criterion, the similarity criterion depending on position of one or more uniform delimiter values and/or element values.

6. The article of claim 2 in which the first subset of element fields includes at least one of:

a segment name field;

a trading partner field;

a transaction type field;

a loop identifier field; and a position field.

7. The article of claim 6 in which the first subset of element fields includes at least the segment name field.

8. The article of claim 2 in which at least one starting transaction segment data item includes one or more delimiters; each delimiter having one of a set of delimiter values; a third one of the replacement artifacts indicating that, for one of the delimiters, its delimiter value was replaced by one of a set of one or more uniform delimiter values.

9. The article of claim 8 in which at least one of the delimiter values is one of a set of segment termination values and the set of uniform delimiter values includes a subset of one or more uniform segment termination values; each uniform segment termination value in the subset replacing delimiter values in the set of segment termination values; in each segment group data structure, the segment type data items it includes being in a series, with each pair of preceding and following segment type data items in the series separated by a uniform delimiter value in the subset of uniform segment termination values.

10. The article of claim 9 in which the subset of uniform segment termination values includes only one uniform segment termination value.

11. The article of claim 9 in which the set of uniform delimiter values includes a first uniform delimiter value that replaces delimiter values in the set of segment termination values.

12. The article of claim 11 in which the set of uniform delimiter values includes a second uniform delimiter value that replaces delimiter values not in the set of segment termination values.

13. The article of claim 9 in which the set of segment termination values includes only one value.

14. The article of claim 1 in which the data storage component includes at least one of an integrated circuit, random access memory, read-only memory, programmed logic memory, semiconductor memory, magnetic memory, a disk drive device, volatile memory, non-volatile memory, a server device, a database, data memory, and program memory.

15. The article of claim 1 in which the data storage component stores at least one of:

a partial map that includes at least one of the segment group data structures;

a complete map that includes at least one of the segment group data structures; and a library that includes at least one of the segment group data structures.

16. The article of claim 15 in which the data storage component further stores a translation table.

17. The article of claim 1 in which the data storage component stores two or more of the segment group data structures, each of the segment group data structures being different from all of the others.

18. The article of claim 1 in which the standard-based abstraction artifact results from an abstraction operation, the abstraction operation depending on a standard format of a business-accepted standard that the transaction segment data items satisfy; the business-accepted standard being an ANSI United States Electronic Data Standard or a United Nations Electronic Data Interchange for Administration, Commerce and Transportation.

19. The article of claim 18 in which the format criterion specifies the number of bytes in each element field and delimiter.

20. A system comprising:

a processor; and input/output (I/O) circuitry through which the processor is connected to receive input data and provide output data;

the processor being programmed:

to receive transaction data through the I/O circuitry, the transaction data indicating information about transactions between or among trading partners;

to analyze at least part of the transaction data to obtain transaction segment data items, each indicating information about a respective segment of one of the transactions;

to perform an abstraction operation on a set of the transaction segment data items; the abstraction operation including at least one of:

performing a standard-based abstraction operation on transaction segment data items in the set to obtain one or more segment group data structures, each including information about one or more types of transaction segment data items;

performing an abstraction operation on transaction segment data items in the set to obtain attribute data items that indicate attributes of types of transaction; and performing an abstraction operation on transaction segment data items in the set; the abstraction operation including automatically extracting pre-integration information; and to perform at least one of:

using a set of the segment group data structures to provide output data through the I/O circuitry, the output data providing information about the types of transaction segment data items;

using at least part of the pre-integration information to provide output data through the I/O circuitry, the output data indicating usage attributes;

using a set of the segment group data structures to present a report to an operator, the report including information from which the operator can create a map conversion;

comparing a set of the segment group data structures with segment group data structures in a library and obtaining comparison results; and using a set of the attribute data items to obtain a merged attribute data item that includes mapping attributes.

21. A method of using the system of claim 20; the method comprising:

using the transaction segment data items to obtain one or more segment group data structures, each including information about one or more types of transaction segment data items; the act of using the transaction segment data items to obtain segment group data structures comprising:

operating the processor to access a set of the transaction segment data items; and performing a standard-based abstraction operation on transaction segment data items in the accessed set.

22. The method of claim 21 in which at least one of the segment group data structures includes a standard-based abstraction artifact.

23. The method of claim 21 in which the act of performing the standard-based abstraction operation further comprises:

performing a first abstraction operation on transaction segment data items in the accessed set to obtain two or more seglets, each seglet being a segment group data structure that includes information about a respective type of transaction segment data items; and performing a second abstraction operation on a set of the seglets to obtain maplets, each maplet being a segment group data structure that includes a respective seglet set of one or more seglets;

at least one of the first and second abstraction operations including the standard-based abstraction operation.

24. The method of claim 23 in which the act of using transaction segment data items further comprises:

including a first maplet in a second maplet, the first maplet's seglet set being a subset of the second maplet's seglet set.

25. A method of operating the system of claim 20; the method comprising:

operating the processor to perform abstraction and/or integration operations on transaction data items from the I/O circuitry; the act of operating the processor including at least one of:

operating the processor to perform a standard-based abstraction operation on a set of the transaction data items to produce a stored segment group data structure in the system, the stored segment group data structure being accessible by the processor;

operating the processor to perform an abstraction operation that includes automatically extracting pre-integration information from a set of the transaction data items and to store the pre-integration information, the pre-integration information being accessible by the processor; and operating the processor to perform an integration operation that uses a set of transaction type attribute data items to obtain a merged attribute data item that includes mapping attributes.

26. An article of manufacture comprising:

a data storage component;

a processor connected to access data stored by the data storage component; and stored by the data storage component:

one or more segment group data structures, each including information about one or more types of transaction segment data items; and one or more attribute data items that indicate attributes of types of transactions;

the segment group data structures resulting from one or more operations that use starting transaction segment data items to obtain respective resulting data items; each starting transaction segment data item including one or more element fields, each element field having a respective element value that is one of a set of possible element values of a respective transaction-related attribute;

the attribute data items including:

at least one type attribute data item indicating at least one of a type of transaction, a segment name, a trading partner, a type of loop, a position, sender, receiver, standards version, document type, document number, document date, control numbers, and control counts;

the article further comprising, stored by the data storage component, one or more of:

in the segment group data structures, in each of a first subset of one or more of the element fields, a universal element value that represents any type of element value; the universal element value replacing the field's respective element value;

in the segment group data structures, in each of a second subset of one or more of the element fields, a respective relevant identifier that includes the field's respective element value and that is relevant in grouping segments of transactions;

in the attribute data items, at least one usage attribute data item indicating one or more of: whether a field is always, sometimes, or never used in data items of the same type; whether a field always has the same value in data items of the same type; transaction scope; trading partner scope; whether a field or element is hard coded; whether a field or element is empty; and a complete list of all values found for a field or element; and in the attribute data items, a merged attribute data item that indicates how a specific field is mapped.

27. The article of claim 26 in which, in one of the second subset of elements, at least one respective relevant identifier is coded to describe what information will be submitted in other fields.

28. The article of claim 26, further comprising, stored by the data storage component:

a uniform value resulting from changing a relevant identifier to a less specific, but different, uniform value.

29. The article of claim 26 in which the article comprises, stored by the data storage component, all of:

in each of the first subset of the element fields, the universal element value;

in each of the second subset of element fields, the respective relevant identifier;

the at least one usage attribute data item; and the merged attribute data item.

30. A method of using data processing systems, comprising:

using transaction segment data items stored in a data processing system to obtain one or more segment group data structures, each including information about one or more types of transaction segment data items; the system including a processor connected to access the stored transaction segment data items; the act of using transaction segment data items to obtain segment group data structures comprising:

operating the processor to access a set of the stored transaction segment data items; and performing abstraction on transaction segment data items in the accessed set; the processor being programmed to perform at least part of the abstraction; the abstraction including:

performing standard-based abstraction on transaction segment data items in the accessed set to obtain two or more seglets, each seglet being a segment group data structure that includes information about a respective type of transaction segment data items; and using a set of the seglets to obtain maplets, each maplet being a segment group data structure that includes a respective seglet set of one or more seglets;

in using the set of the seglets to obtain maplets, the processor:

comparing one of the seglets with existing seglet type entries; each existing seglet type entry including a respective sequence of values, the respective sequence including at least one uniform element value; if one of the existing seglet type entries matches the seglet, incrementing a count in the matching seglet type entry; if none of the existing seglet type entries matches the seglet, adding a seglet type entry that matches the seglet to the existing seglet type entries; and comparing a seglet type entry from the existing seglet type entries with existing maplet entries; if one of the existing maplet entries matches the seglet type entry, adding the seglet type entry's respective sequence of values to the matching maplet entry; if none of the existing maplet entries matches the seglet type entry, adding a maplet entry to the existing maplet entries, the added maplet entry including the seglet type entry's respective sequence of values.

31. A method of using data processing systems, comprising:

using transaction data items stored in a data processing system to obtain one or more first grouping data structures and one or more second grouping data structures, each first grouping data structure including information about one or more types of transaction data items, each second grouping data structure including information about one or more of the first grouping data structures; the system including a processor connected to access the stored transaction data items; the act of using transaction data items to obtain the first grouping data structures and the second grouping data structures comprising:

operating the processor to access a set of the stored transaction data items; and performing abstraction on transaction data items in the accessed set; the processor being programmed to perform at least part of the abstraction; the abstraction including:

performing standard-based abstraction on transaction data items in the accessed set to obtain two or more first grouping data structures, each first grouping data structure including information about a respective type of transaction data items;

comparing one of the first grouping data structures with existing first group type entries; each existing first group type entry including a respective sequence of values, the respective sequence including at least one uniform element value; if one of the existing first group type entries matches the first grouping data structure, incrementing a count in the matching first group type entry; if none of the existing first group type entries matches the first grouping data structure, adding a first group type entry that matches the first grouping data structure to the existing first group type entries; and comparing a first group type entry from the existing first group type entries with existing second group entries; if one of the existing second group entries matches the first group type entry, adding the first group type entry's respective sequence of values to the matching second group entry; if none of the existing second group entries matches the first group type entry, adding a second group entry to the existing second group entries, the added second group entry including the first group type entry's respective sequence of values.

* * * * *